(12) United States Patent
Cheng

(10) Patent No.: US 12,196,426 B2
(45) Date of Patent: Jan. 14, 2025

(54) OUTDOOR BARBECUE OVEN

(71) Applicant: Yi Cheng, Jiangsu (CN)

(72) Inventor: Yi Cheng, Jiangsu (CN)

(*) Notice: Subject to any disclaimer, the term of this patent is extended or adjusted under 35 U.S.C. 154(b) by 635 days.

(21) Appl. No.: 17/400,127

(22) Filed: Aug. 12, 2021

(65) Prior Publication Data

US 2022/0163216 A1 May 26, 2022

(30) Foreign Application Priority Data

Nov. 25, 2020 (CN) .......................... 202011344424.1

(51) Int. Cl.
  *F24C 15/18* (2006.01)
  *A47J 37/07* (2006.01)
  *F24C 15/12* (2006.01)

(52) U.S. Cl.
  CPC ........... *F24C 15/18* (2013.01); *A47J 37/0786* (2013.01); *A47J 2037/0777* (2013.01)

(58) Field of Classification Search
  CPC ............ A47J 37/0786; A47J 2037/0777; A47J 37/07; A47J 37/0763; F24C 15/18
  USPC ................................................. 126/9 R, 25 R
  See application file for complete search history.

(56) References Cited

U.S. PATENT DOCUMENTS

| 6,073,894 A * | 6/2000 | Chen ................... A47J 37/0786 108/115 |
| 6,213,265 B1 * | 4/2001 | Wang ....................... A45C 9/00 280/37 |
| 2002/0078943 A1 * | 6/2002 | Montgomery .......... F24C 15/18 126/38 |
| 2018/0363920 A1 * | 12/2018 | Park ......................... F24C 3/14 |

FOREIGN PATENT DOCUMENTS

| KR | 20130005535 U | * | 9/2013 |
| KR | 101859875 B1 | * | 5/2018 |

* cited by examiner

*Primary Examiner* — Michael G Hoang
*Assistant Examiner* — Logan P Jones

(57) ABSTRACT

The invention discloses an outdoor barbecue oven, comprising an oven body, a cooking bench, an oven, tables, a functional plate, and a lamp holder; when folded, the cooking bench, the oven, the tables, the function plate, and the lamp holder are all located in the oven body; when unfolded, the oven body, the cooking bench, the oven, and the tables are connected in sequence; the functional plate is connected to the side end of the oven body, wherein the functional plate is connected to the oven body through a clasp, and the cooking bench is connected to the oven body through a table hinge; the cooking bench, the oven, and the tables are connected by connecting pieces; the lamp holder is fixed on the top of the oven body; the cooking bench is installed with locking pieces.

9 Claims, 20 Drawing Sheets

OUTDOOR BARBECUE OVEN

BACKGROUND OF THE INVENTION

1. Field of the Invention

The invention relates to the field of outdoor products, in particular to an outdoor barbecue oven.

2. Description of the Related Art

There are already manufacturers in the existing market that produce and sell outdoor ovens, including folding ovens and disassembly ovens; however, all the connecting pieces, tables, sinks, holders, etc., are made of existing metal parts and formed by simple hinges, which are very inconvenient to disassemble and assemble, and the volume after disassembly is still large, which is difficult to store and transport.

SUMMARY OF THE INVENTION

The purpose of the invention is to design an outdoor barbecue oven to solve the problems above. The specific design plan is:

an outdoor barbecue oven, comprising an oven body, a cooking bench, an oven, tables, a functional plate, and a lamp holder; when folded, the cooking bench, the oven, the tables, the function plate, and the lamp holder are all located in the oven body; when unfolded, the oven body, the cooking bench, the oven, and the tables are connected in sequence; the functional plate is connected to the side end of the oven body, wherein the functional plate is connected to the oven body through a clasp, and the cooking bench is connected to the oven body through a table hinge; the cooking bench, the oven, and the tables are connected by connecting pieces; the lamp holder is fixed on the top of the oven body; the cooking bench is installed with locking pieces;

the oven comprises side plates, end plates, a bottom plate, and a top plate; the tops of the side plates and the end plates are both connected to the top plate through angle beams; the top end of the angle beam is fixedly connected to the bottom surface of the top plate; the bottoms of the two side plates and the two sides of the bottom plate, the tops of the two side plates and the angle beams, and the two end plates and the angle beams are all rotatably connected by through shafts;

the lamp holder is a rod-shaped structure formed by inserting and embedding a plurality of lamp poles in sequence; the light pole at the bottom is fixedly connected to the top surface of the oven body through a mounting nut, and the light pole at the top is connected to a tail pole; the tail pole is a rectangular metal rod; the tail pole is hung with a light bulb; when folded, the tail pole is embedded in the light pole; when unfolded, the tail pole and the light poles form a "7"-shaped structure as a whole;

the clasp comprises a base block and a hook that are rotatably connected; the base block is fixedly connected to the oven body; the base block is a box-shaped structure with an opening at the side end; the open end of the base block is provided with an end cover; the end cover is a rectangular frame-shaped metal plate placed vertically; the hook is rotatably connected to the end cover; when the hook rotates to one end, that is, when it can no longer be rotated in one direction, the hook is located inside the base block; when the hook rotates to the other end, that is, rotates in the opposite direction until it can no longer be rotated, the hook is located outside the base block and the vertical interface of the hook is in a "J"-shaped structure;

the connecting piece comprises a pressing plate and a connecting plate, wherein the pressing plate and the connecting plate are in a "T"-shaped structure as a whole; the left and right sides of the connecting plate are both provided with a metal hook; the pressing plate, the connecting plate, and the metal hook are an integral structure formed at one time; the left and right sides of the connecting plate are both provided with the table; the table is located between the metal hook and the pressing plate;

the locking piece comprises a rotating handle, a base, and a rope; the rotating handle is rotatably connected to the base; the base is installed with a limiting cylinder; the limiting cylinder is installed with a first ratchet shaft; the top of the limiting cylinder is provided with a limiting ring; the rotating handle is connected to the first ratchet shaft and the limiting ring through a first ratchet teeth and a second ratchet teeth that are meshed with each other; the rope penetrates the limiting cylinder and the first ratchet shaft.

The oven body is a rectangular parallelepiped; the top of the oven body is an oven cover; the oven cover is in interference connection with the oven body; the lamp holder is installed on the oven cover;

the bottom of the oven body is provided with universal wheels, and the universal wheels are bolted to the bottom of the oven body; the number of the universal wheels is multiple; optimally, the number of the universal wheels is four, and the four universal wheels are respectively located at the four corners of the bottom of the oven body;

the side end of the oven body is provided with a pulling rod; the pulling rod can be purchased directly; a hole is punched on the oven body at the position corresponding to the installation hole of the pulling rod, which is then installed on the oven body through bolts.

The side end of the cooking bench is connected to one end of the table hinge, the number of the table hinges is multiple, and the other end of the table hinge is connected to the side wall of the oven body; when the table hinge is unfolded, the cooking bench and the top surface of the oven body are located on the same plane; after the table hinge is folded, the cooking bench is placed upside down on the top surface of the oven body;

the cooking bench is a gas stove; the locking piece is located on the side wall of the cooking bench; the oven body is provided with a locking catch; the locking piece is provided with a rope; when the table hinge is folded, the rope is sleeved on the locking catch; the number of the locking pieces is multiple, and the positions of the rope and the locking catch of the multiple locking pieces correspond to each other.

The top of the oven is provided with a grill; the grill is a metal mesh provided with a plurality of through holes; the grill is embedded in the top plate and the top surface of the grill is the same height as the top surface of the top plate; the grill is used to place ingredients, and the through holes on the grill are used to put the oil from the ingredients into the oven;

the oven is provided with a carbon rack; a plurality of the carbon racks is a mesh metal rack formed by welding metal strips arranged vertically and horizontally; the oven is provided with "L" section steel, and the carbon rack is placed on the "L" section steel;

a locking bolt and a locking pin are connected between the end plate and the angle beam; the locking pin penetrates the locking bolt in a horizontal direction and is embedded in the end plate; the locking bolt and the locking pin ensure the stability of the oven after the oven is unfolded, and prevent the side plates and end plates of the oven from rotating and skewing due to bumps or shaking;

the lower edge of the angle beam, the upper edge of the side plate, and the lower edge of the side plate are all provided with a plurality of cylindrical protrusions; the protrusions and the angle beams, the protrusions and the side beams are all integral structures formed at one time;

the table and the oven are supported by table legs; the table legs are rotatably connected to the table and the oven through hinges; one end of the hinge is bolted to the table leg, and the other end thereof is bolted to an "U"-shaped steel; the "U"-shaped steel is fixedly connected to the bottom surface of the table and the bottom surface of the top plate; when the hinge is folded, the table legs are parallel to the table.

The functional plate comprises a flat plate and a sink; the cooking bench is in the main cooking location; the functional plate is installed on the oven body, which is relatively close to the cooking bench, and at the same time forms a corner integrally with the cooking bench and the oven body; ingredients and kitchen utensils can be placed on the flat plate and the oven cover, and the tableware and ingredients can be cleaned by pouring water into the sink; one side of the bottom of the functional board is installed with a column; the top end of the column is embedded in the bottom of the functional plate and connected by threads, and the bottom end of the column abuts against the ground; the other side of the bottom of the functional board is provided with a hanging rod; the hanging rod is a metal rod, the hanging rod is welded to the functional plate, and the hanging rod is mounted on the hook; one end of the functional plate is supported by the column, and the other end thereof is supported by the oven body.

The light pole is a metal pole whose diameter decreases from bottom to top, and the light pole is rotatably connected to the tail pole by a limiting pin;

the light pole at the top is provided with a first embedding hole and a second embedding hole on both sides of the light pole; the length of the first embedding hole is greater than the length of the tail pole, and the length of the second embedding hole is equal to the width of the tail pole;

the bottom of the light pole at the bottom is provided with a mounting bolt; the mounting bolt is welded and connected to the light pole, and is used to be threaded with other functional parts of the outdoor barbecue oven;

the end of the tail pole is provided with a third embedding hole, and a handle of the lamp bulb is embedded in the third embedding hole to prevent the light bulb from slipping off the light at tail when using and disassembling the lamp holder;

when folded, the tail pole passes through the first embedding hole and is embedded in the light pole;

when unfolded, the tail pole is embedded from top to bottom and mounted in the second embedding hole, that is, the bottom of the tail pole is mounted on the second embedding hole;

the mounting bolt is provided with the mounting nut, and the mounting nut is threaded with the mounting bolt; the mounting nut is used to adjust the direction; since the tail pole does not necessarily face the required direction after installation, it is necessary to adjust the direction by twisting the mounting nut when the tail pole faces the oven.

The end cover is provided with a plurality of lugs; the lug and the end cover are an integral structure formed by one-time casting; the base block is provided with a plurality of grooves; the number of the grooves and the lugs are equal and the positions are corresponding; the groove and the base block are an integral structure formed by one-time casting; the lug is embedded in the groove, and the bolt used to connect the base block and the oven body passes through the lug and the groove in sequence and is embedded in the oven body.

The hook is in shaft pin connection with the end cover, the end cover is provided with a plurality of embedding grooves formed therewith in sequence, and the hook is provided with a plurality of shaft holes formed therewith in sequence; a pin shaft penetrates the embedding groove and the shaft hole; the multiple embedding grooves and the multiple shaft holes are all distributed in a linear array in the axial direction of the pin shaft; the embedding grooves and the shaft holes are spaced apart.

The base block comprises a box body and an outer edge; the box body and the outer edge are an integral structure formed by one-time casting; the vertical section of the outer edge is coupled with the end cover; one side of the outer edge is fixedly connected to the end cover, and the other side thereof abuts against the oven body; the box body is embedded in the oven body;

the embedding groove is in a "C"-shaped structure; the pin shaft is in key connection with the shaft hole, and the pin shaft is rotatably connected to the embedding groove.

The two metal hooks are symmetrical about the axis of the connecting plate. The connecting piece is used to connect the two adjacent platens; since the pressing plate and the connecting plate are in a "T"-shaped structure, that is, the bottom surface of the pressing plate is on both sides of the connecting plate, at this time, the two adjacent platens are located between the two sets of the metal hook and the pressing plate;

the metal hook is located at the bottom or middle of the connecting plate. The metal hook is located at any height of the connecting plate, and its height depends on the thickness of the connected platen or the height of the side end plate;

the platen is in a plate-like structure; the metal hook and the pressing plate are in an "L"-shaped structure as a whole; the top surface of the platen abuts against the bottom surface of the pressing plate; the bottom surface of the platen is mounted on the horizontal side of the "L"-shaped structure;

the outer extension of the platen is provided with a side end plate; the metal hook and the pressing plate are in a "J"-shaped structure as a whole; the top surface of the platen abuts against the bottom surface of the pressing plate; the side end plate is embedded in the "J"-shaped structure;

the two adjacent platens are connected by a plurality of connecting pieces, and the plurality of the connecting pieces are distributed in a linear array along the gap between the platens;

the platen comprises the table and the top plate.

The rotating handle is an inverted barrel structure; the first ratchet teeth is located on the inner wall of the rotating handle; the inner top surface of the rotating handle is provided with a second ratchet shaft; the first ratchet shaft meshes with the ratchet teeth of the second ratchet shaft; the second ratchet shaft and the rotating handle, and the first ratchet teeth and the rotating handle are all integral structures formed at one time; the outer side of the rotating handle is provided with anti-slip lines;

the outer ring side of the limiting ring is provided with an arc-shaped connecting sheet; the second ratchet teeth is located on the outer ring side of the connecting sheet; a gap is left between the connecting sheet and the limiting ring; the connecting piece, the limiting ring, and the second ratchet teeth are an integral structure formed at one time; the number of the connecting pieces is multiple; the multiple connecting pieces are distributed in a circular array on a horizontal section centered on the axis of the first ratchet shaft;

the top of the limiting cylinder is provided with a first limiting piece and a second limiting piece formed therewith at one time; the lower side end of the limiting cylinder is provided with a third limiting piece and a fourth limiting piece formed therewith at one time; the upper side end of the limiting cylinder is provided with a fifth limiting piece formed therewith at one time; the first limiting piece is a cylindrical structure formed by a plurality of arc-shaped metal sheets distributed in a circular array; a gap is left between the multiple arc-shaped metal sheets; the first ratchet shaft and the second ratchet shaft are embedded in the first limiting piece from the upper and lower ends; the second limiting piece comprises a plurality of metal sheets distributed in a circular array; the number of the metal sheets is the same as the number of the connecting sheets; the limiting ring is located between the first limiting piece and the second limiting piece; the second limiting piece is embedded in the gap between the limiting ring and the connecting sheet; the first limiting piece and the second limiting piece are used to provide guidance for the movement and rotation of the limiting ring, the limiting cylinder, the first ratchet shaft, and the rotating handle in the axial direction, that is, the limiting ring, the first ratchet shaft, and the rotating handle cannot move in the horizontal direction, but can only move in the vertical direction and rotate in the horizontal direction; the third limiting piece and the fourth limiting piece are embedded in the gap of the base; the third limiting piece and the fourth limiting piece are used to fix the limiting cylinder on the base; the rope penetrates the third limiting piece; the fifth limiting piece is in a ring structure, and the bottom surface of the fifth limiting piece abuts against the top surface of the barrel eaves of the rotating handle barrel structure; the fifth limiting piece limits the maximum height of the rotating handle in the vertical direction to prevent the rotating handle from coming out;

the upper and lower ends of the first ratchet shaft are both sleeved with a limiting disc; the rope is wound on the first ratchet shaft; sufficient space is left between the first ratchet shaft and the inner wall of the limiting cylinder for storing the rope wound on the first ratchet shaft; the limiting disc is used to limit the first ratchet shaft to prevent it from moving in the horizontal direction in the limiting cylinder;

the base is provided with a compression ring, and the compression ring is threaded with the base;

the meshing direction of the first ratchet shaft and the second ratchet shaft is opposite to the meshing direction of the first ratchet teeth and the second ratchet teeth.

The outdoor barbecue oven obtained by the above technical solutions of the invention has the following advantageous effects:

The invention adopts workpieces such as a clasp, a rotating handle, and locking pieces to connect various parts of the outdoor barbecue oven, which is convenient and quick. After disassembly and folding, the volume of each component is small, which can be stored in the oven body for moving by the pulling rod and the universal wheels.

Figure 1:
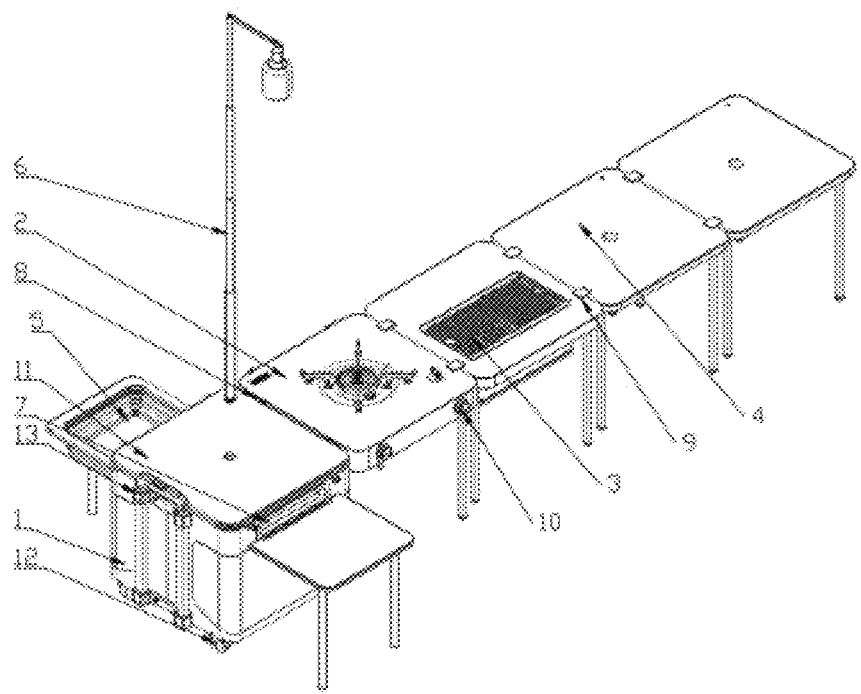
FIG. 1 is a schematic diagram of the structure of the outdoor barbecue oven according to the invention.
Figure 2:
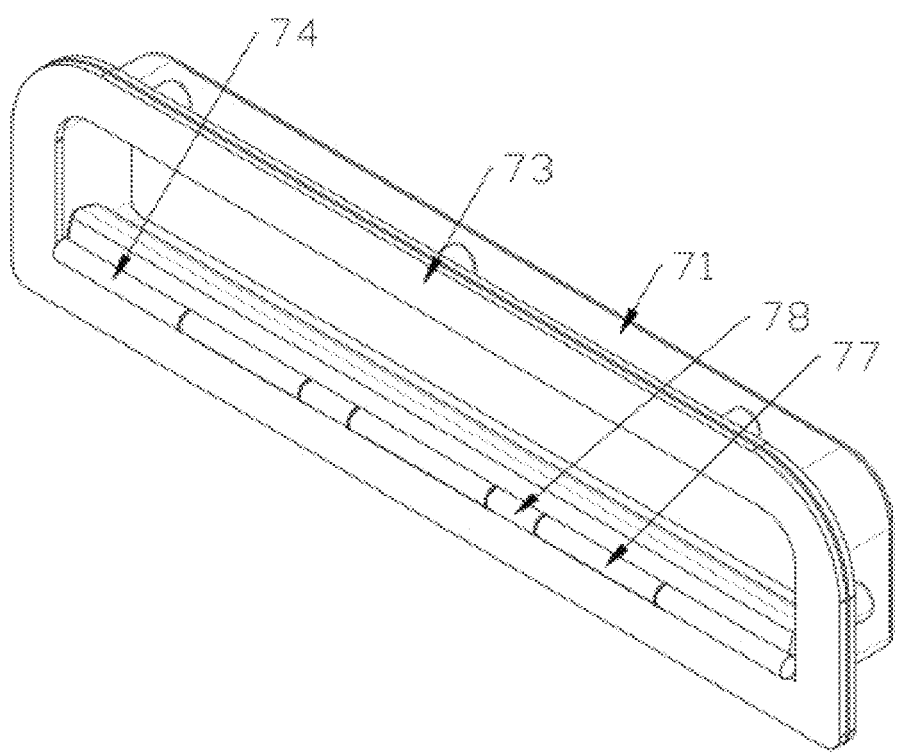
FIG. 2 is a schematic diagram of the structure of the clasp according to the invention when folded.
Figure 3:
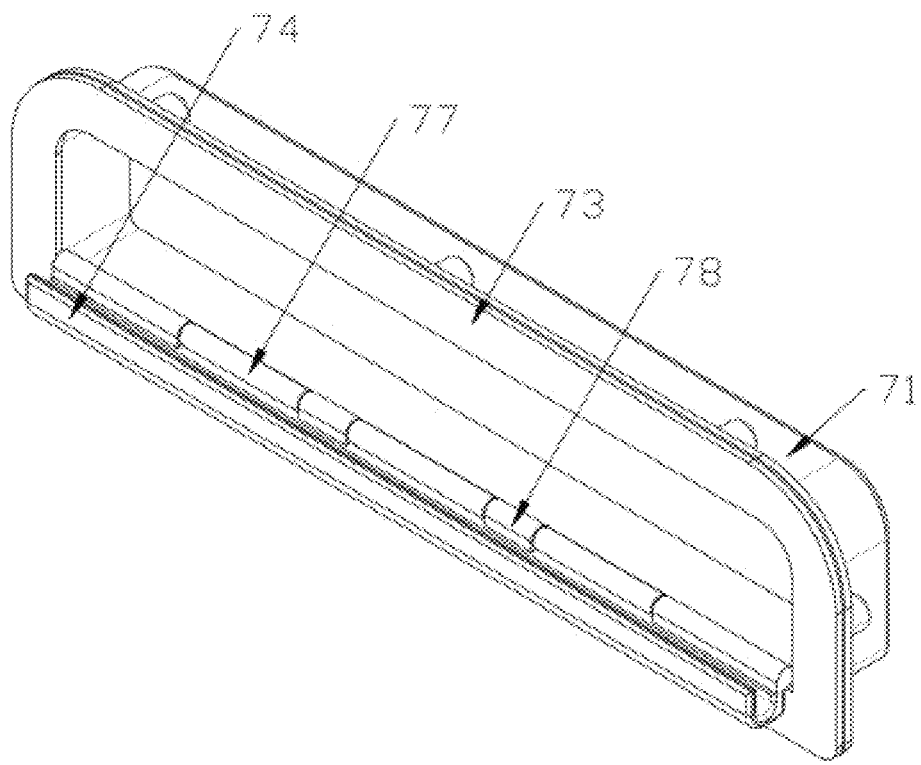
FIG. 3 is a schematic diagram of the structure of the clasp according to the invention when unfolded.
Figure 4:
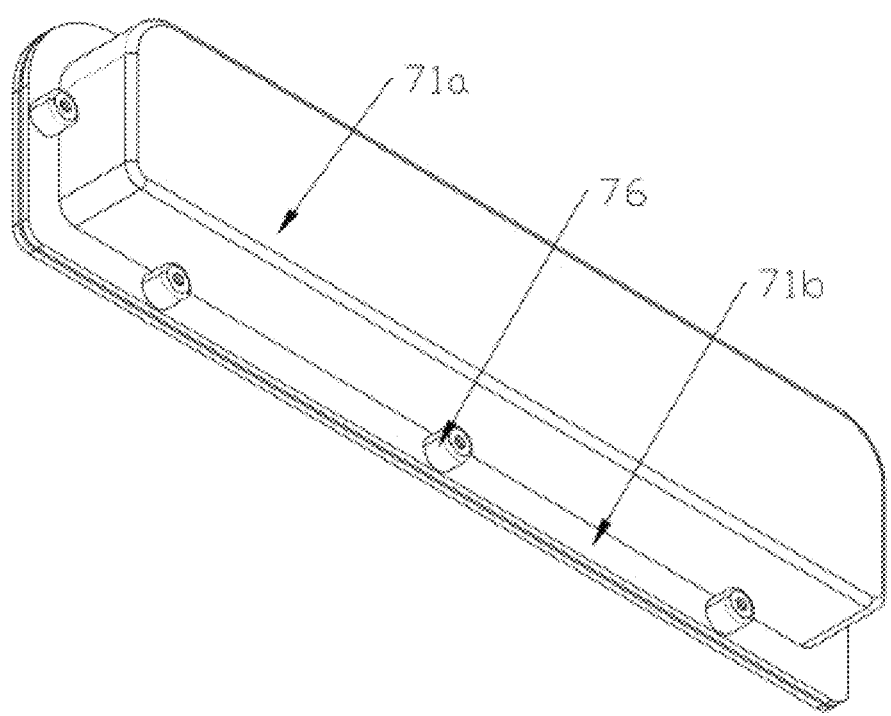
FIG. 4 is a schematic diagram of the structure of the connection between the groove and the base block according to the invention.
Figure 5:
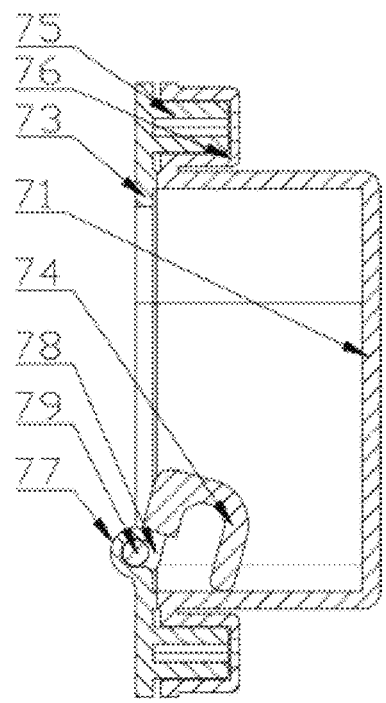
FIG. 5 is a schematic diagram of the cross-sectional structure of the clasp according to the invention.
Figure 6:
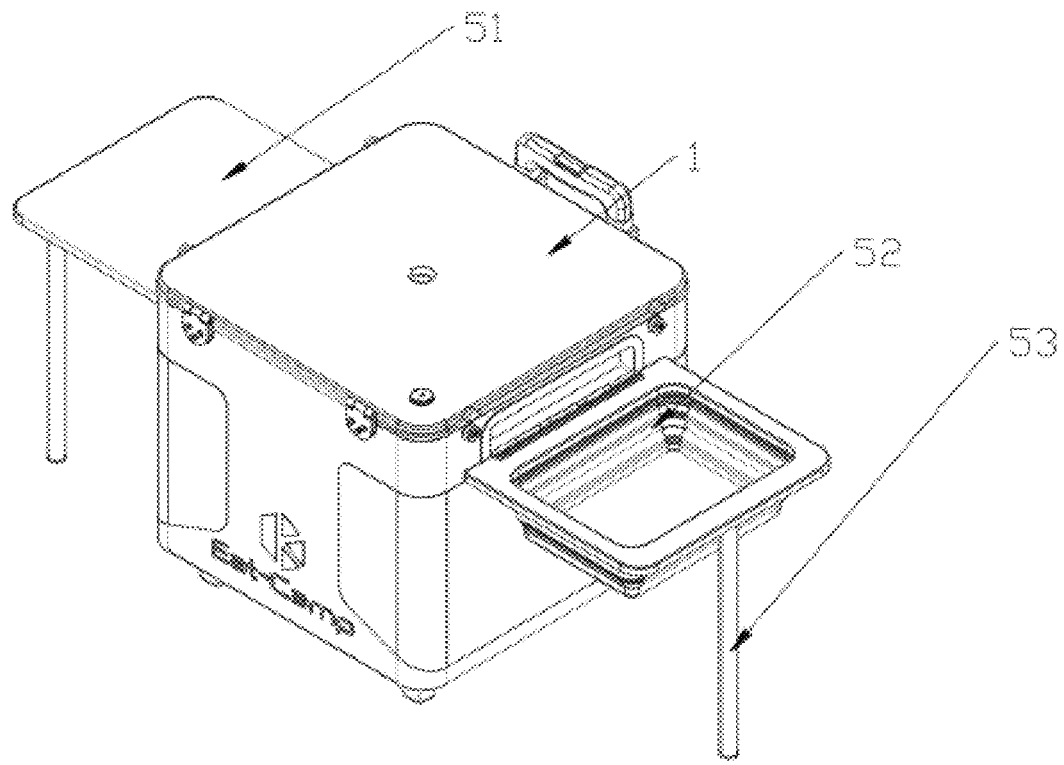
FIG. 6 is a schematic diagram of the structure of the flat plate and the oven body according to the invention after being connected.
Figure 7:
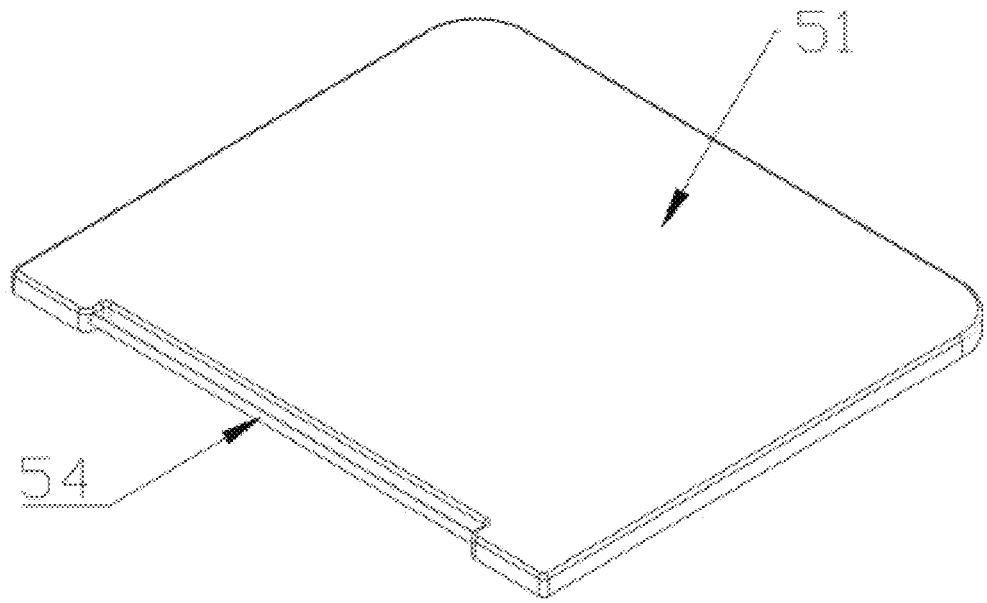
FIG. 7 is a schematic diagram of the structure of the flat plate according to the invention.
Figure 8:
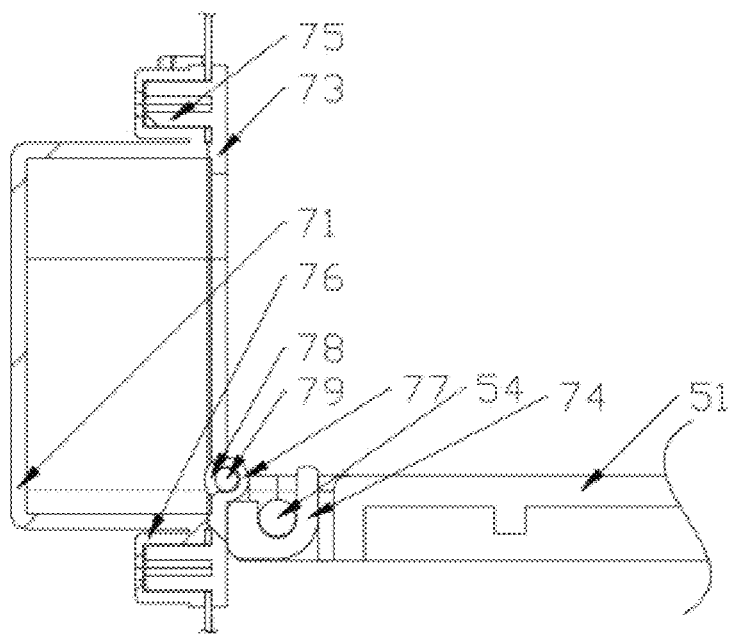
FIG. 8 is a schematic diagram of the cross-sectional structure of the flat plate and the oven body according to the invention after being connected.
Figure 9:
FIG. 9 is a schematic diagram of the structure of the lamp holder according to the invention.
Figure 10:
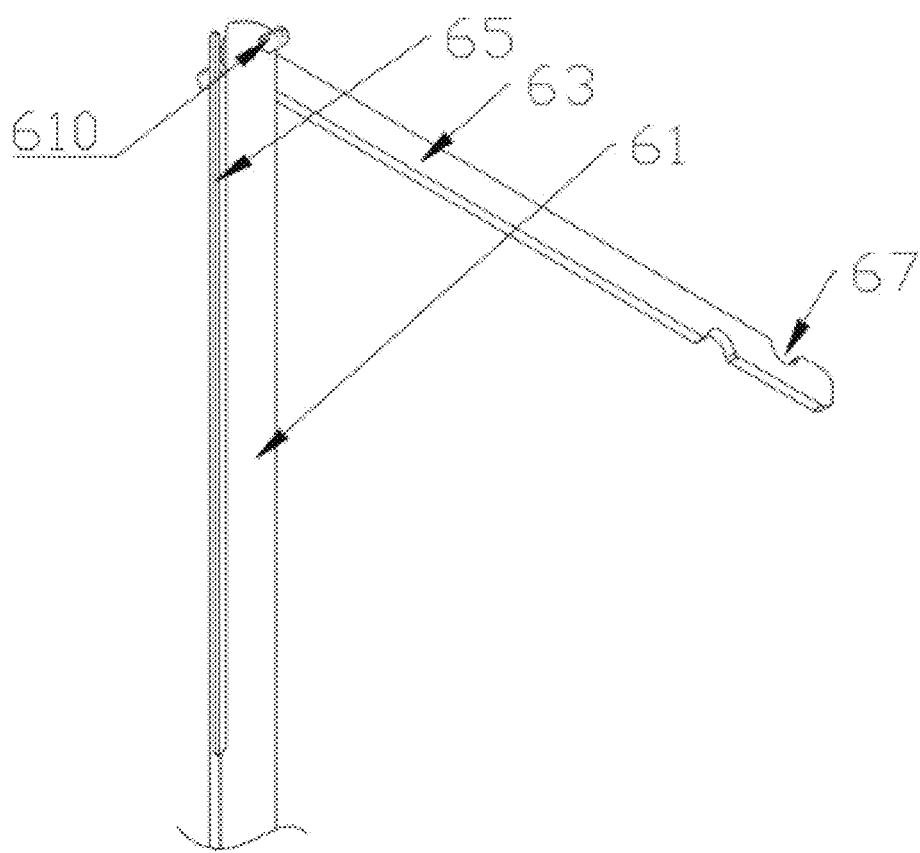
FIG. 10 is a schematic diagram of the structure of the connection between the tail pole and the light pole according to the invention.
Figure 11:
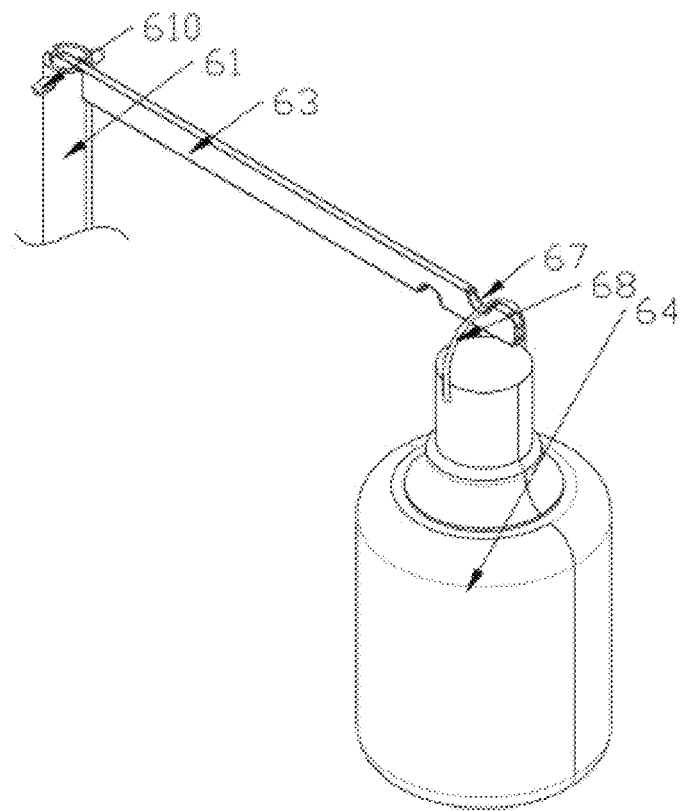
FIG. 11 is a schematic diagram of the structure according to the invention after the light bulb is installed.
Figure 12:
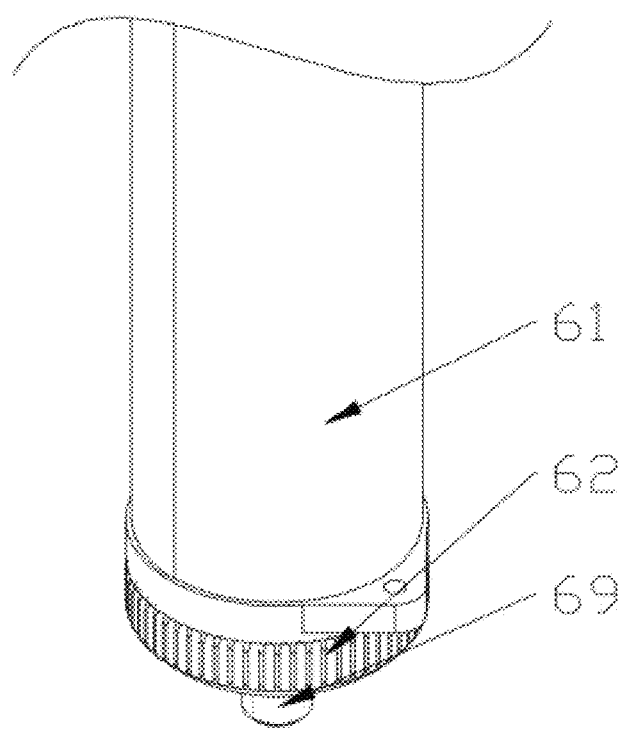
FIG. 12 is a schematic diagram of the structure of the connection between the light pole and the mounting bolt according to the invention.
Figure 13:
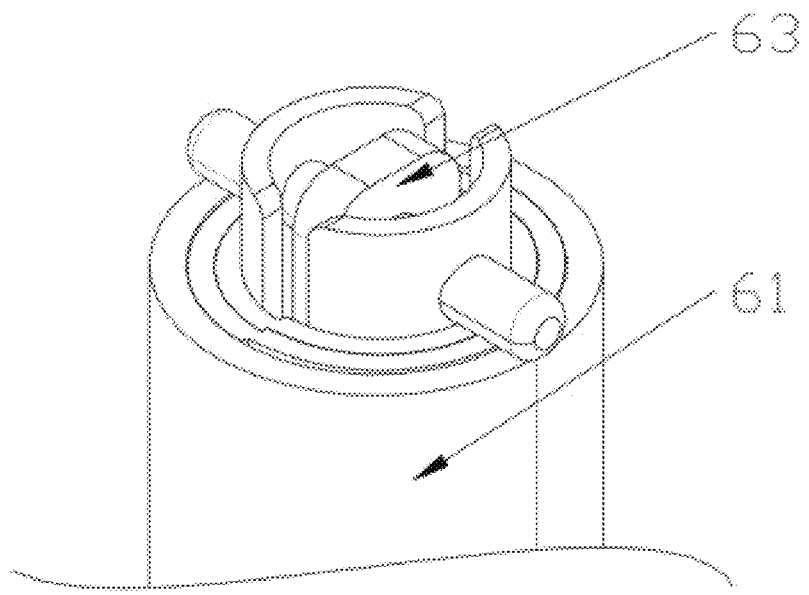
FIG. 13 is a schematic diagram of the structure of the light pole according to the invention after being contracted.
Figure 14:
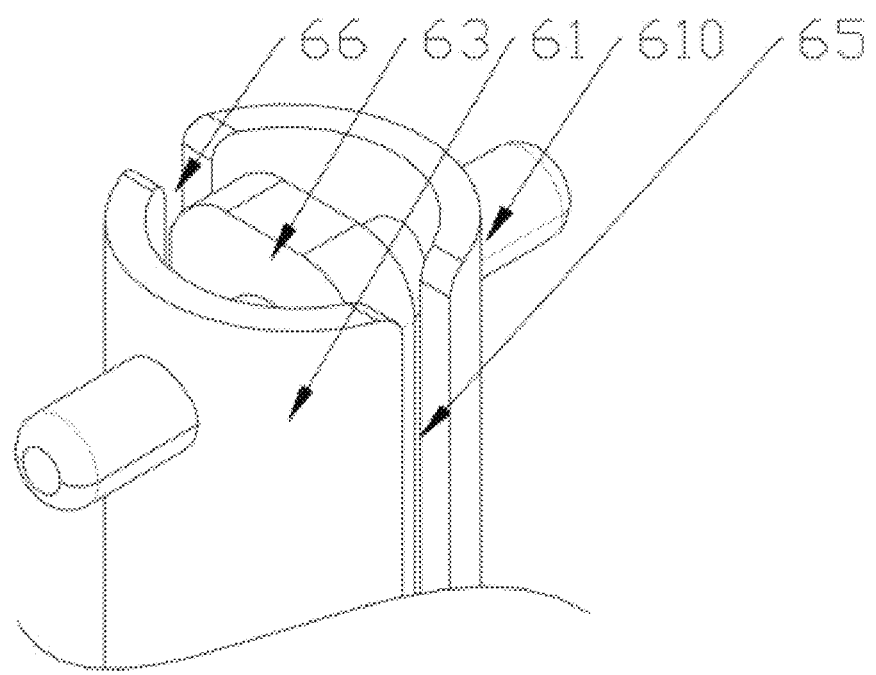
FIG. 14 is a schematic diagram of the structure of the tail pole according to the invention being retracted into the light pole.
Figure 15:
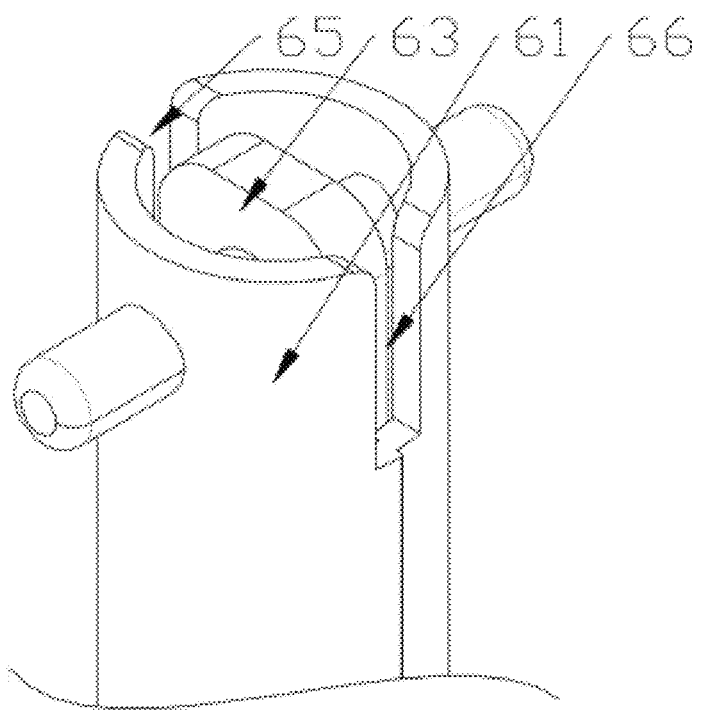
FIG. 15 is a schematic diagram of the structure of the tail pole according to the invention after being retracted into the light pole.
Figure 16:
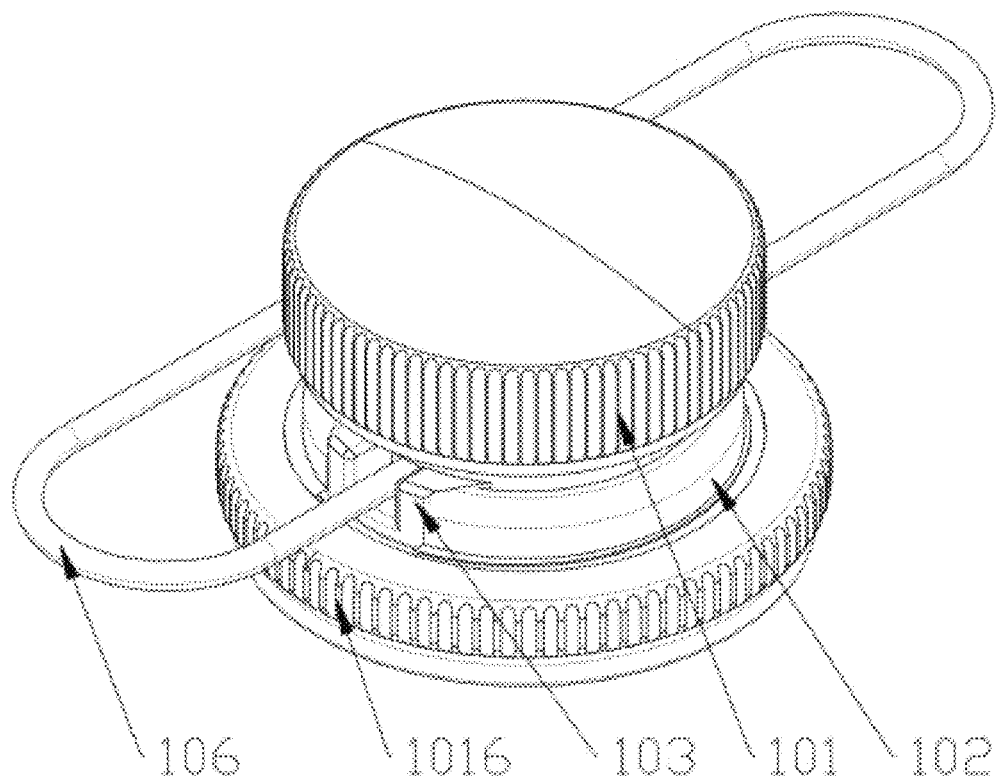
FIG. 16 is a schematic diagram of the structure of the locking piece according to the invention.
Figure 17:
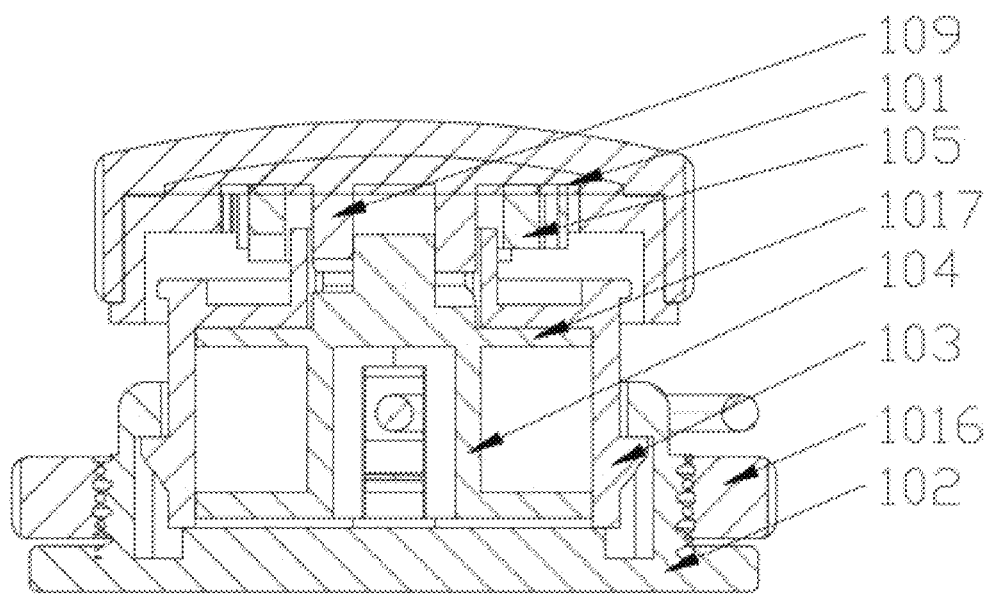
FIG. 17 is a schematic diagram of the cross-sectional structure of the locking piece according to the invention.
Figure 18:
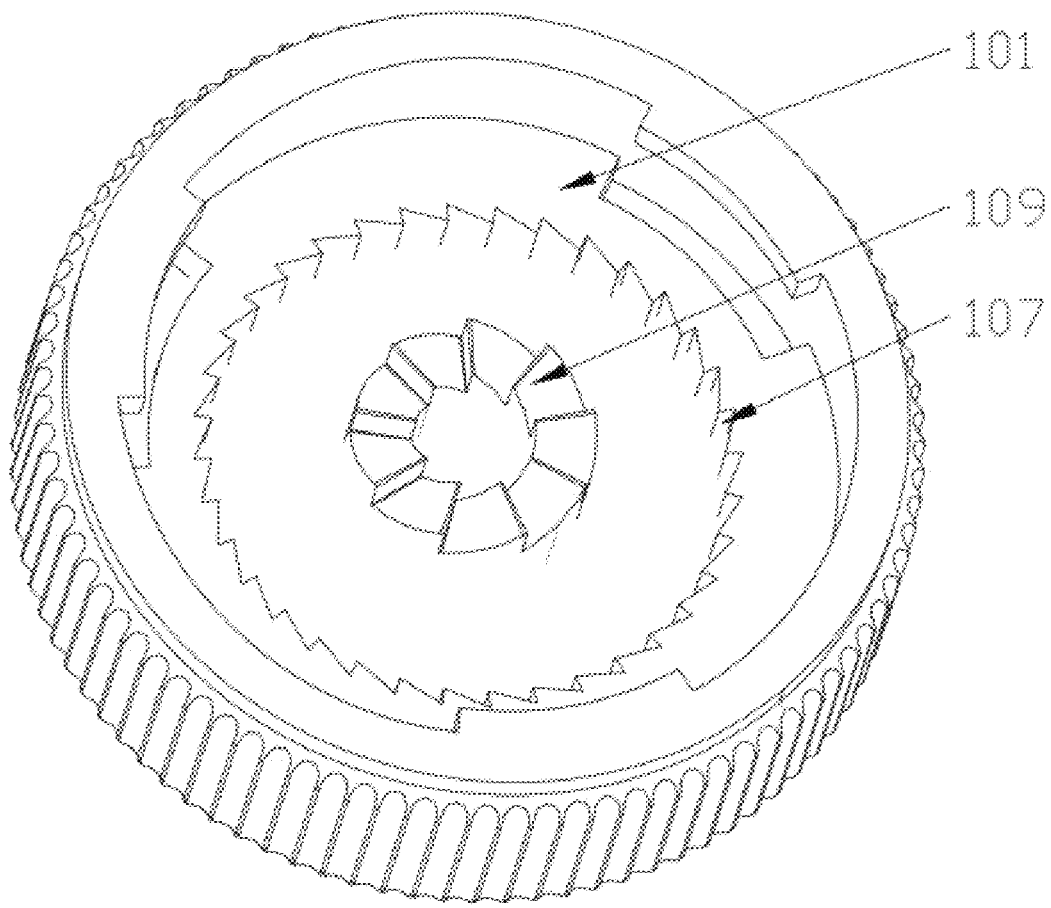
FIG. 18 is a schematic diagram of the structure of the rotating handle according to the invention.
Figure 19:
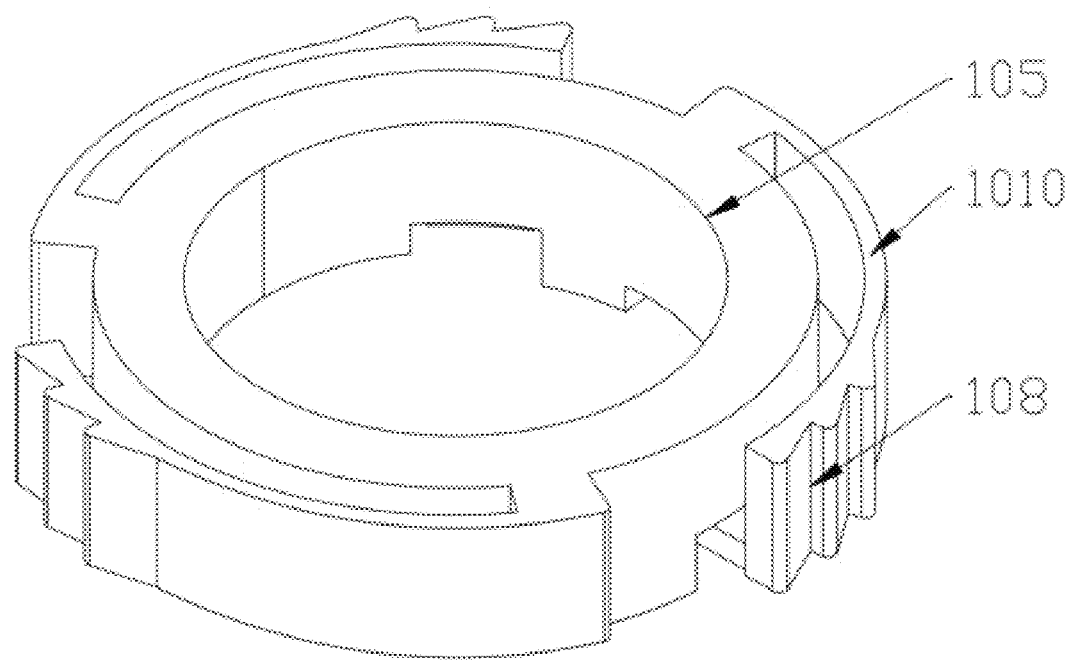
FIG. 19 is a schematic diagram of the structure of the limiting ring according to the invention.
Figure 20:
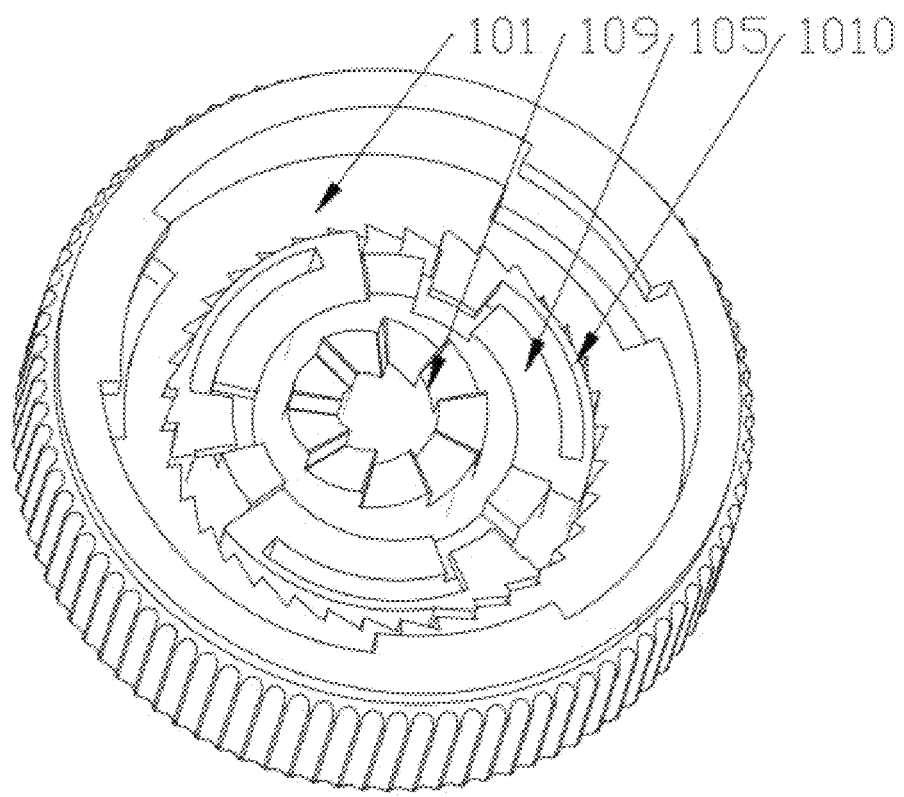
FIG. 20 is a schematic diagram of the structure of the rotating handle and the limiting ring according to the invention after being assembled.
Figure 21:
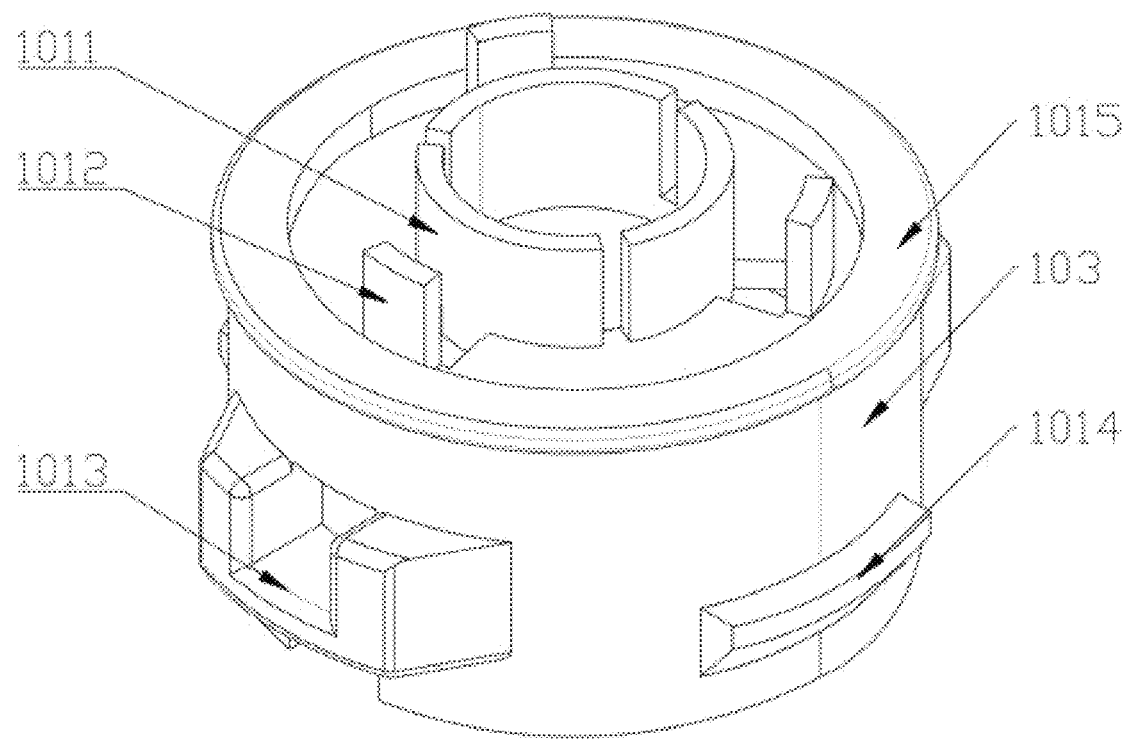
FIG. 21 is a schematic diagram of the structure of the limiting cylinder according to the invention.
Figure 22:
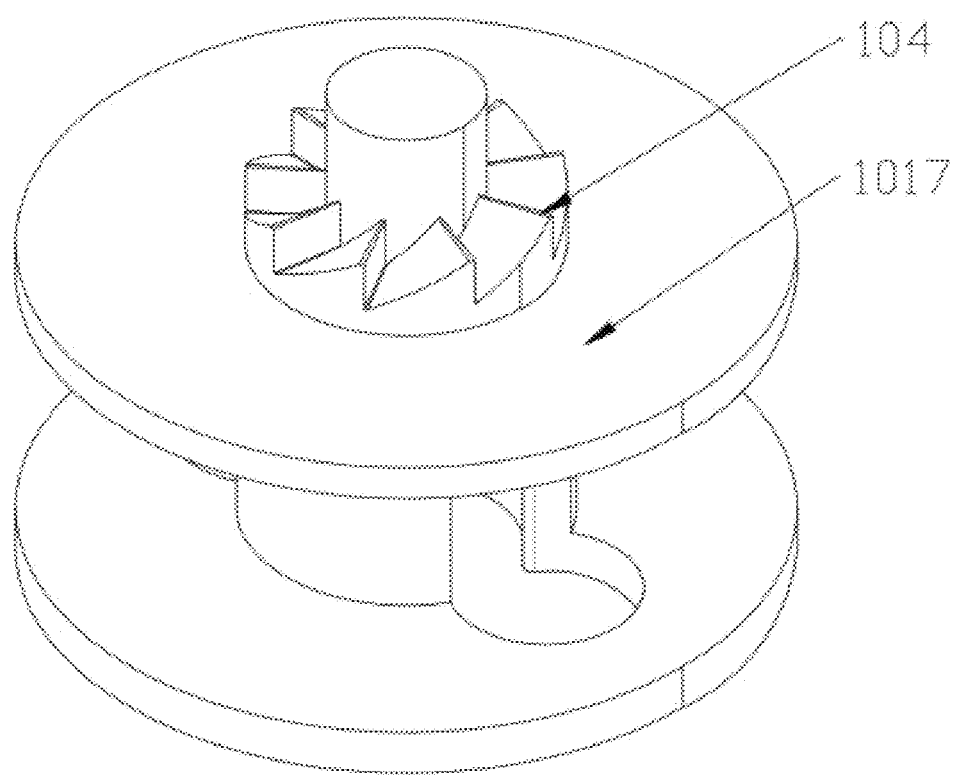
FIG. 22 is a schematic diagram of the structure of the first ratchet shaft according to the invention.
Figure 23:
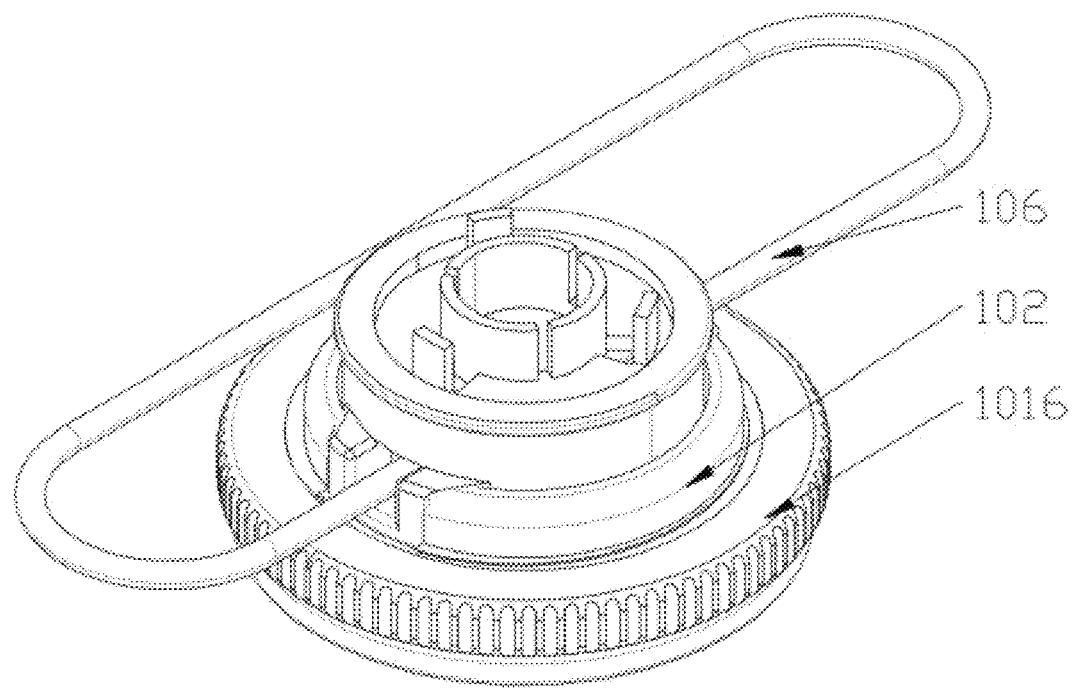
FIG. 23 is a schematic diagram of the structure of the first ratchet shaft and the limiting cylinder and the base according to the invention after being assembled.
Figure 24:
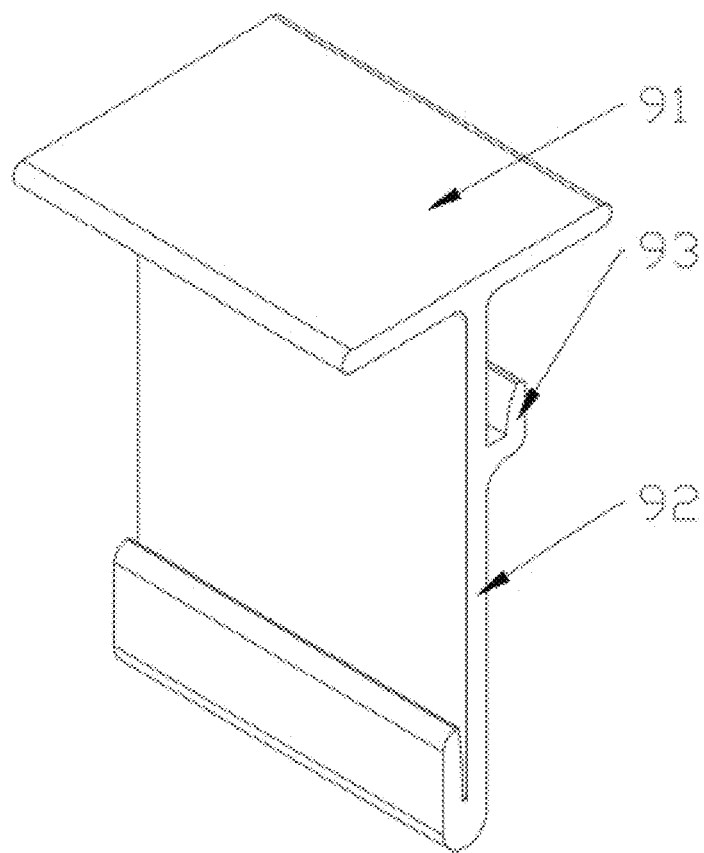
FIG. 24 is a structural diagram of the structure of the connecting piece with metal hooks on both sides at different heights.
Figure 25:
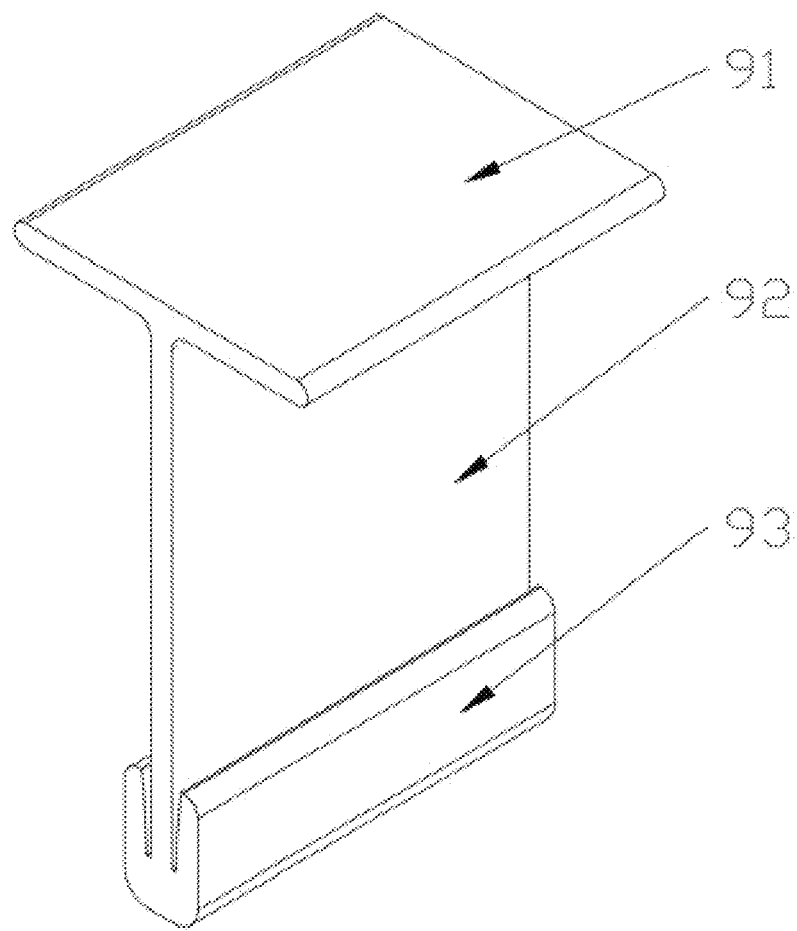
FIG. 25 is a structural diagram of the structure of the connecting piece with metal hooks on both sides at the same height.
Figure 26:
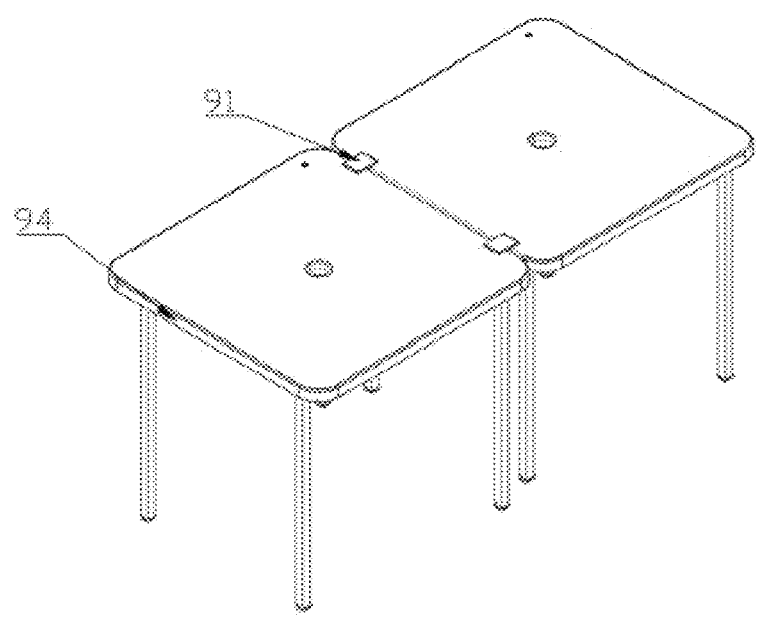
FIG. 26 is a schematic diagram of the top surface of the functional plate after two functional plates are connected by the connecting piece of the invention.
Figure 27:
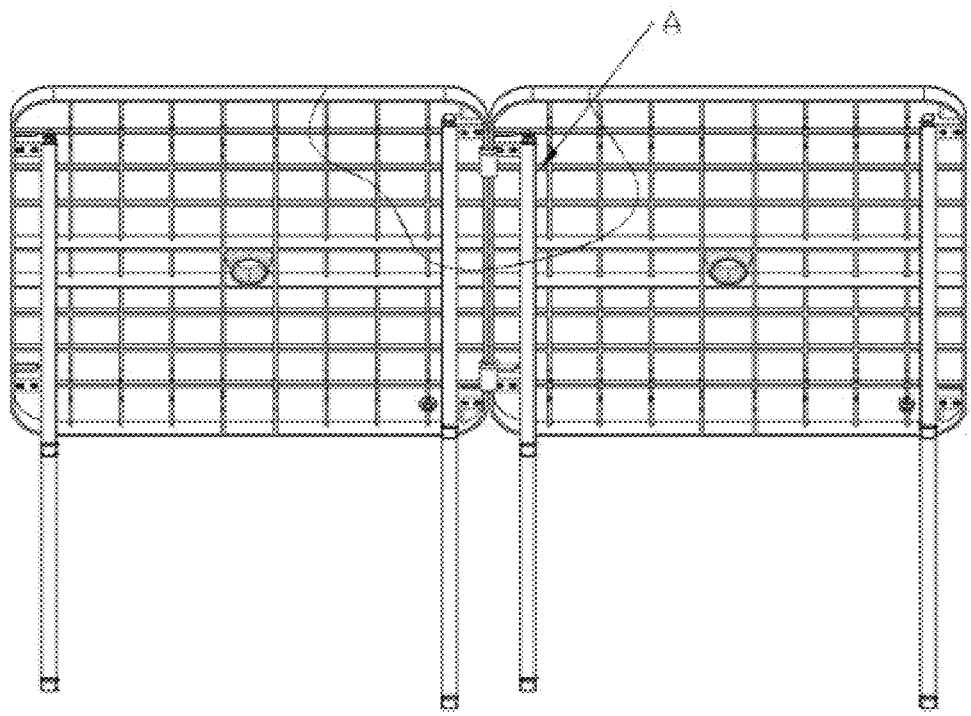
FIG. 27 is a schematic diagram of the bottom surface of the functional plate after two functional plates are connected by the connecting piece of the invention.
Figure 28:
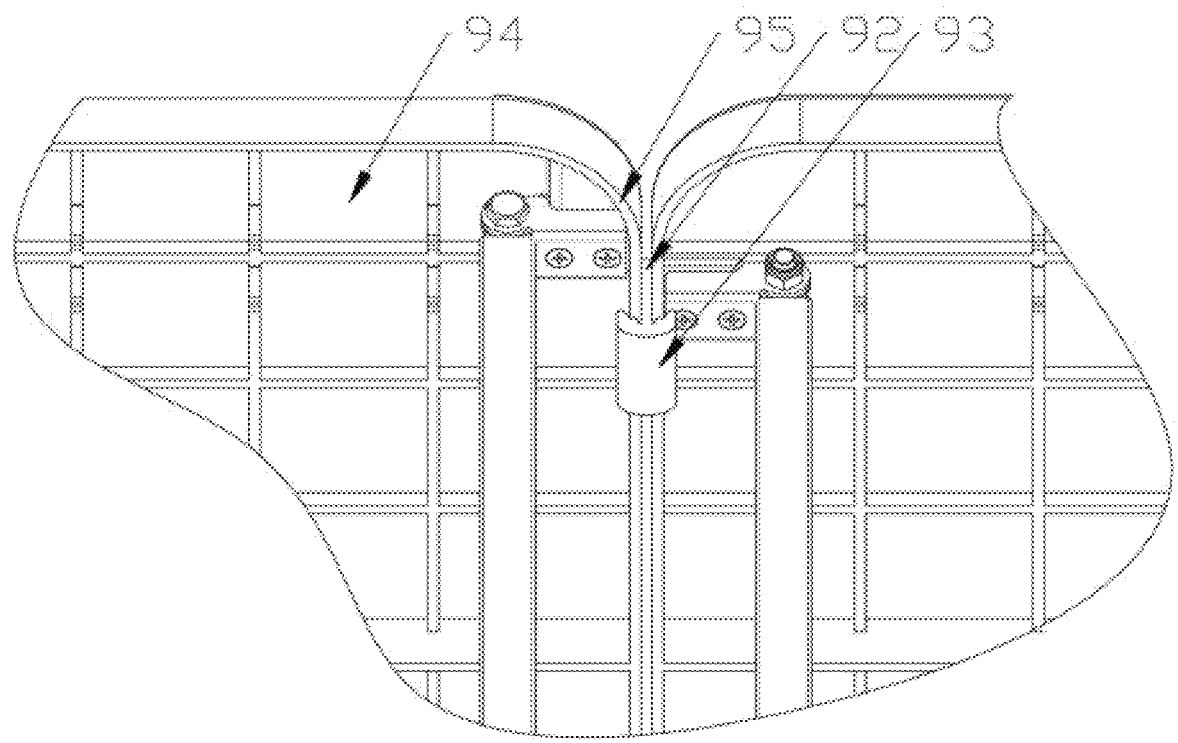
FIG. 28 is a schematic diagram of an enlarged structure at "A" in FIG. 27.
Figure 29:
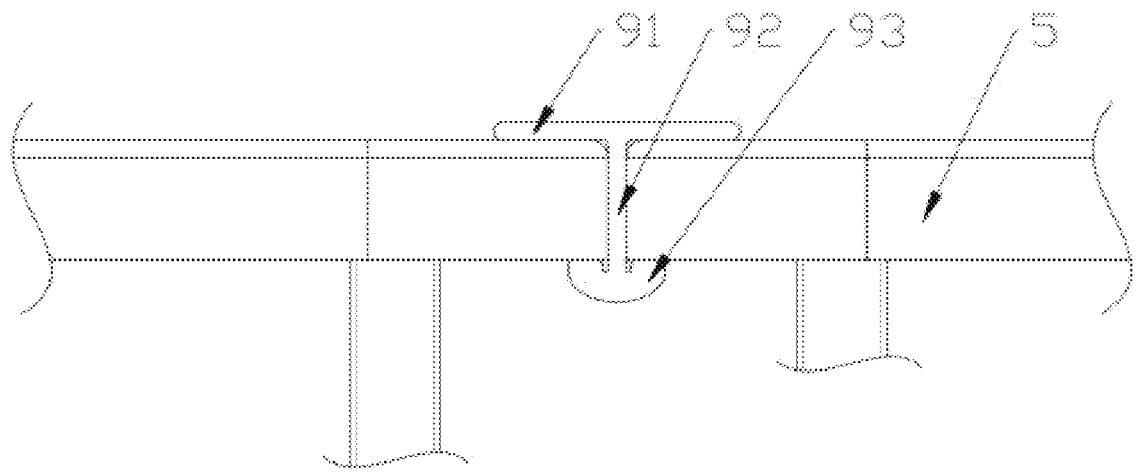
FIG. 29 is a schematic diagram of the side view structure after two functional plates are connected by the connecting piece of the invention.
Figure 30:
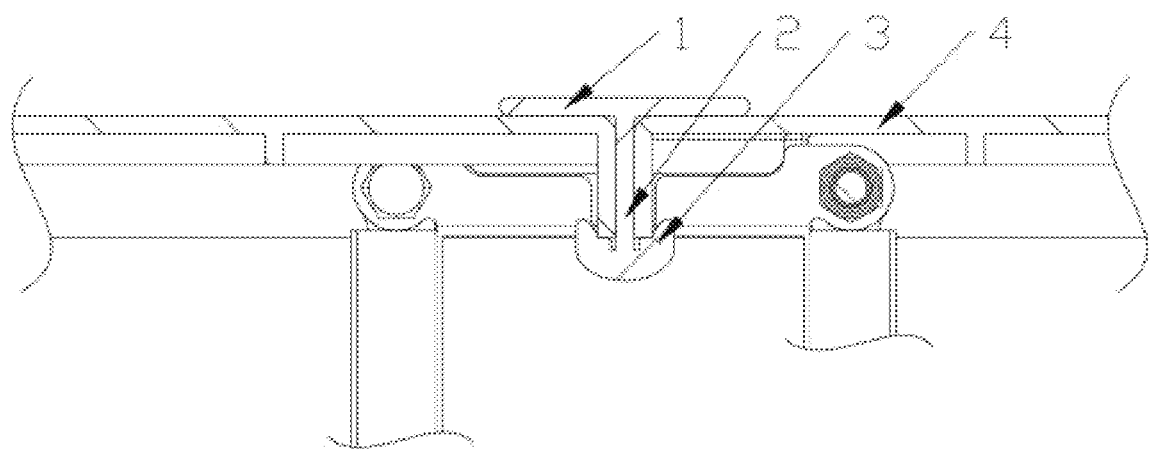
FIG. 30 is a schematic diagram of the cross-sectional structure of FIG. 29.
Figure 31:
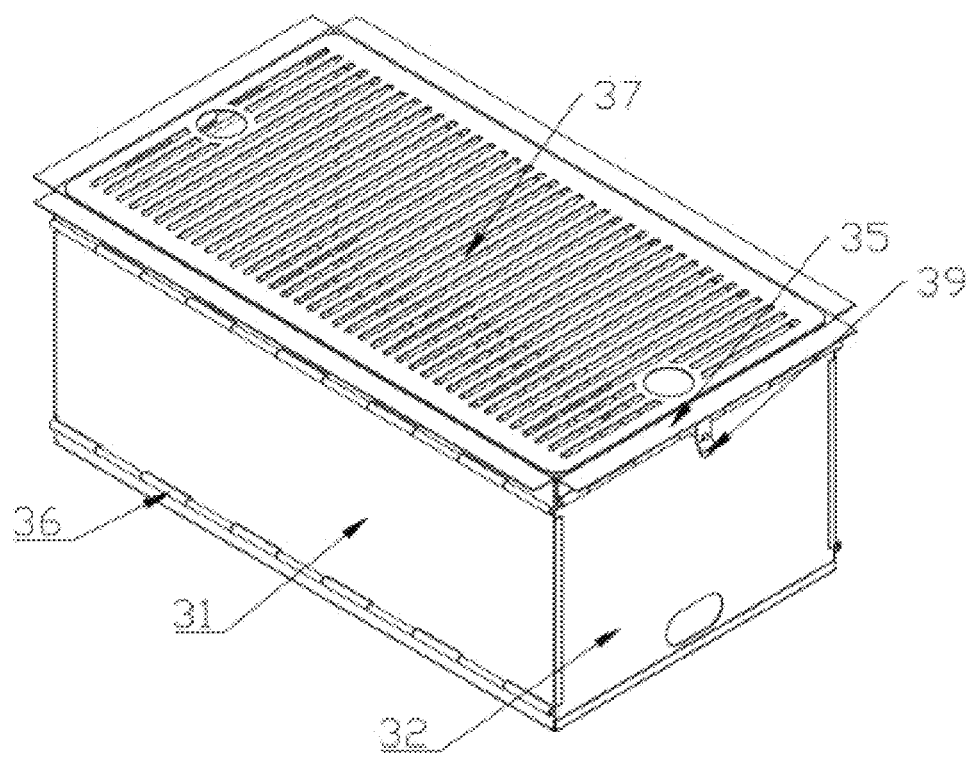
FIG. 31 is a schematic diagram of the structure of the oven according to the invention.
Figure 32:
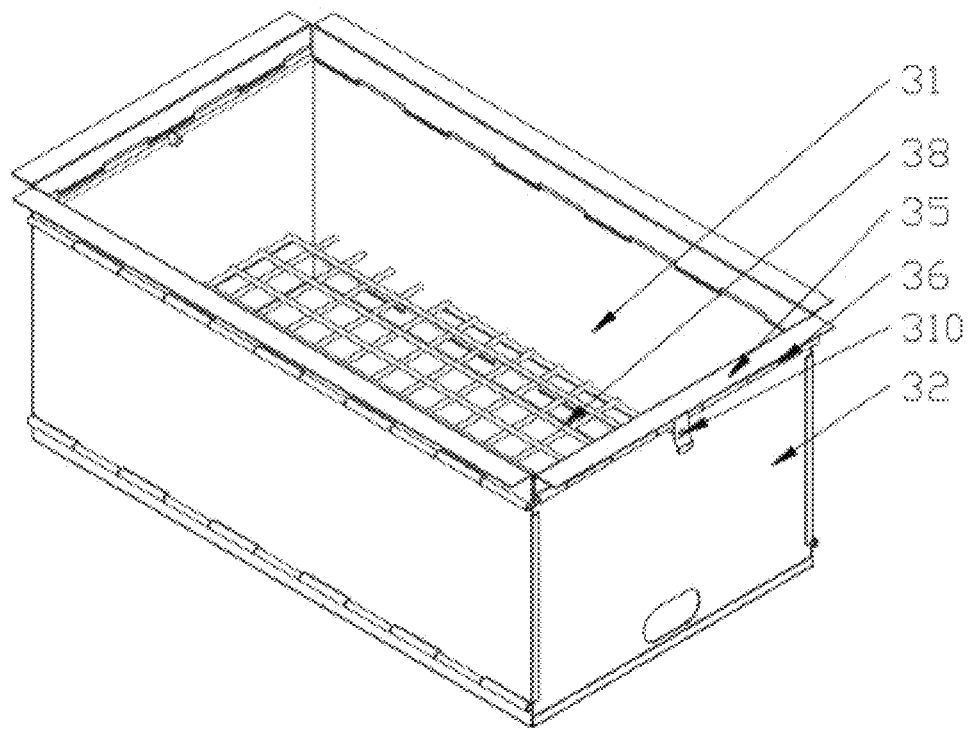
FIG. 32 is a schematic diagram of the internal structure of the oven according to the invention.
Figure 33:
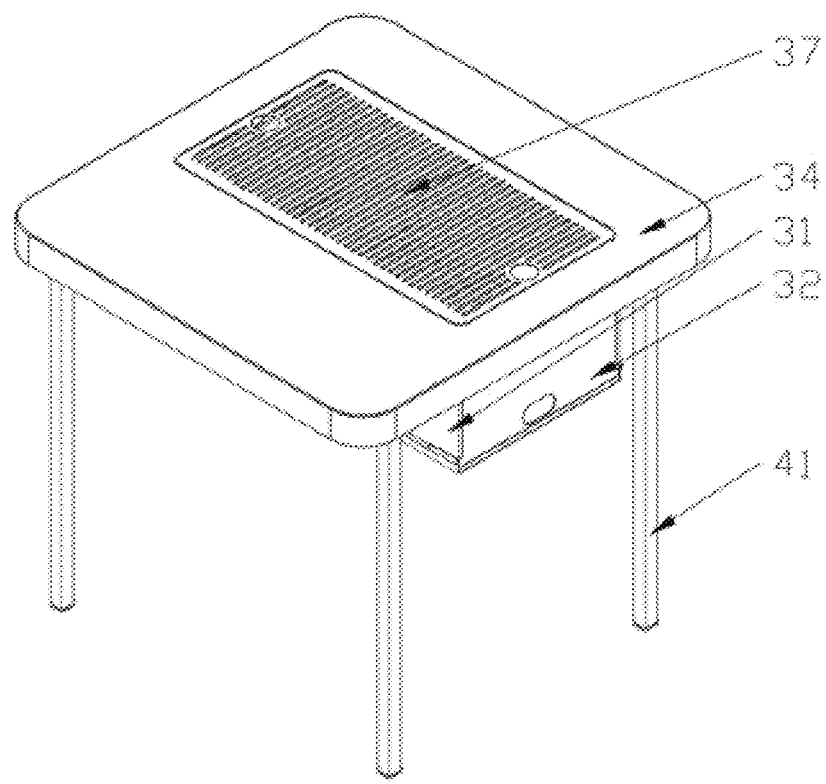
FIG. 33 is a schematic diagram of the upper-right-front side structure of the oven according to the invention when it is connected to the table legs through the top plate.
Figure 34:
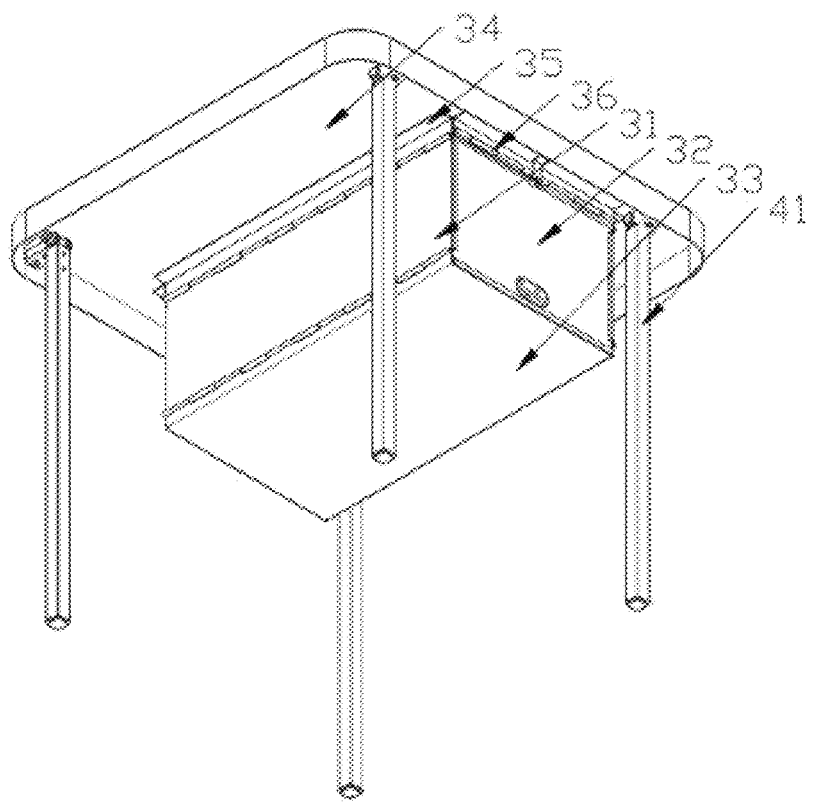
FIG. 34 is a schematic diagram of the lower-right-front structure of the oven according to the invention when it is connected to the table legs through the top plate.
Figure 35:
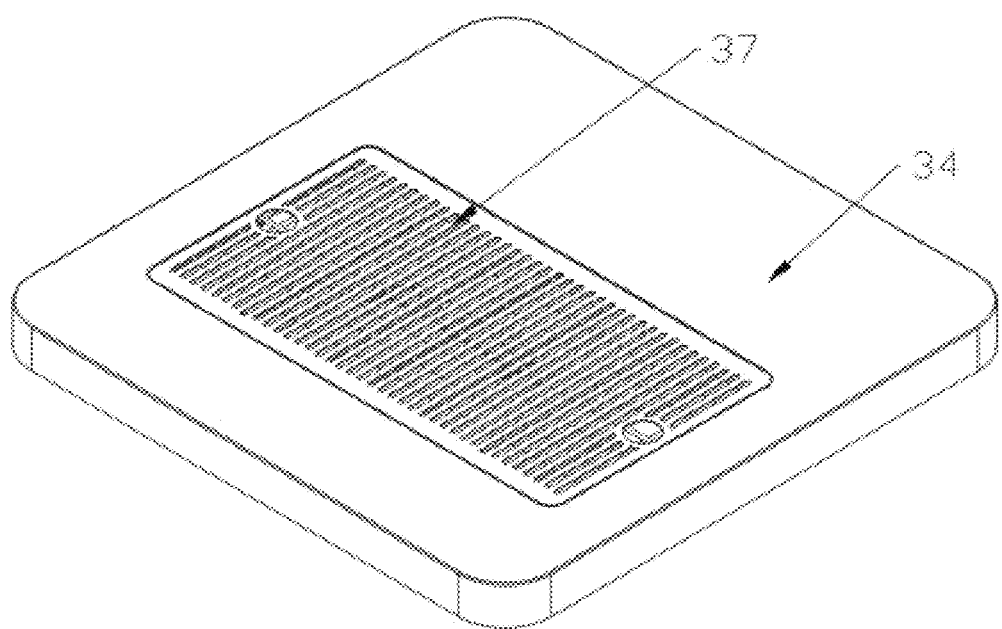
FIG. 35 is a schematic diagram of the upper side structure of the table legs after being folded.
Figure 36:
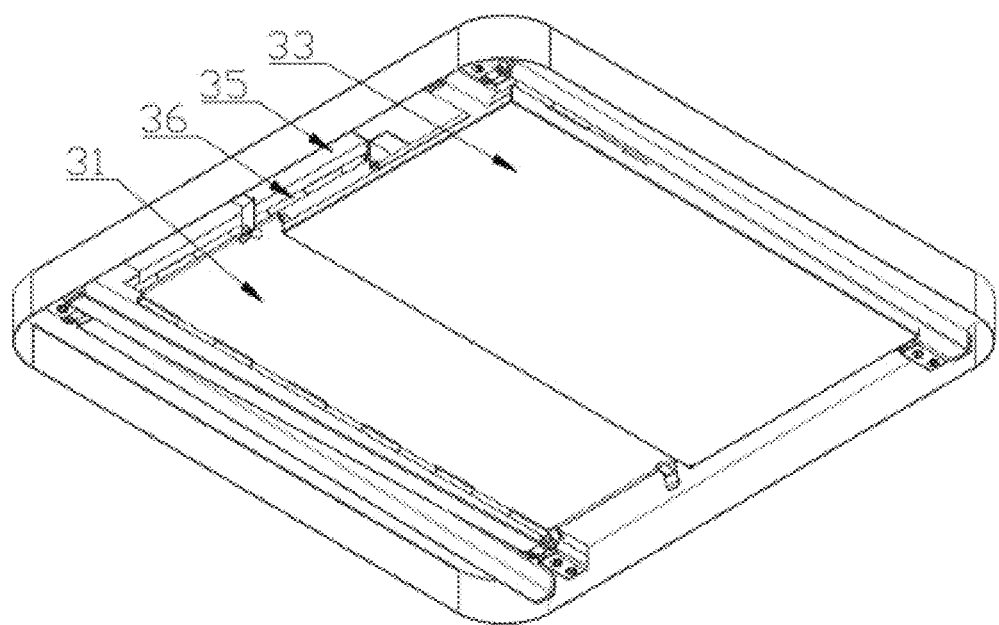
FIG. 36 is a schematic diagram of the lower side structure of the table legs after being folded.
Figure 37:
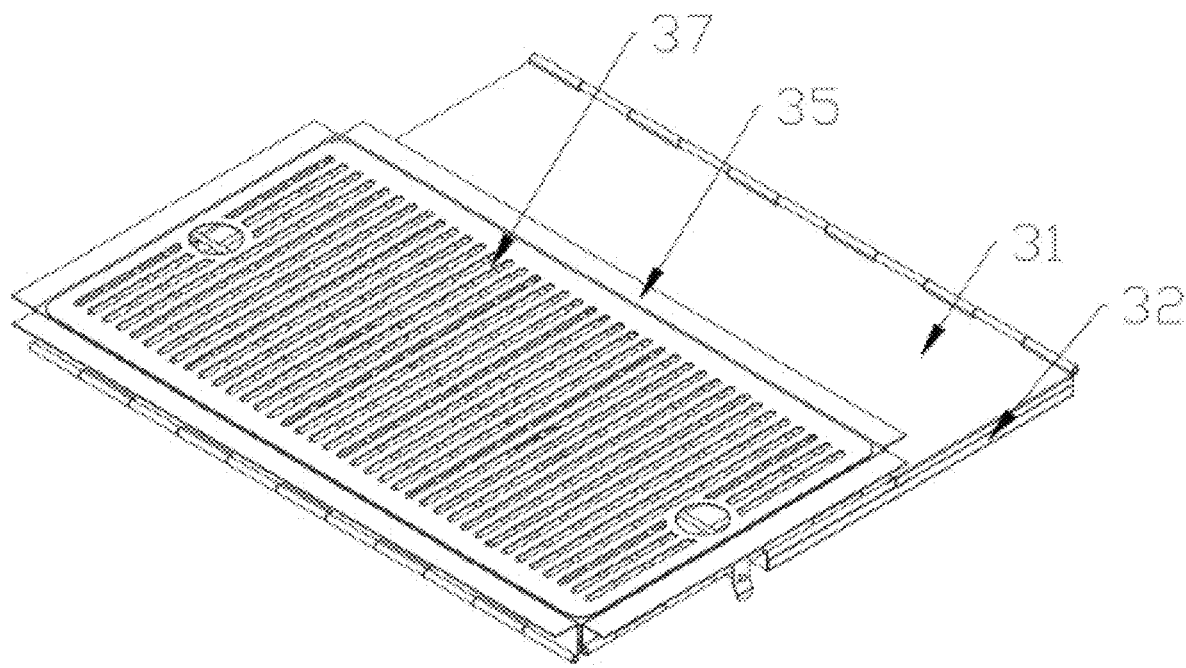
FIG. 37 is a schematic diagram of the upper side structure of the oven after being folded.
Figure 38:
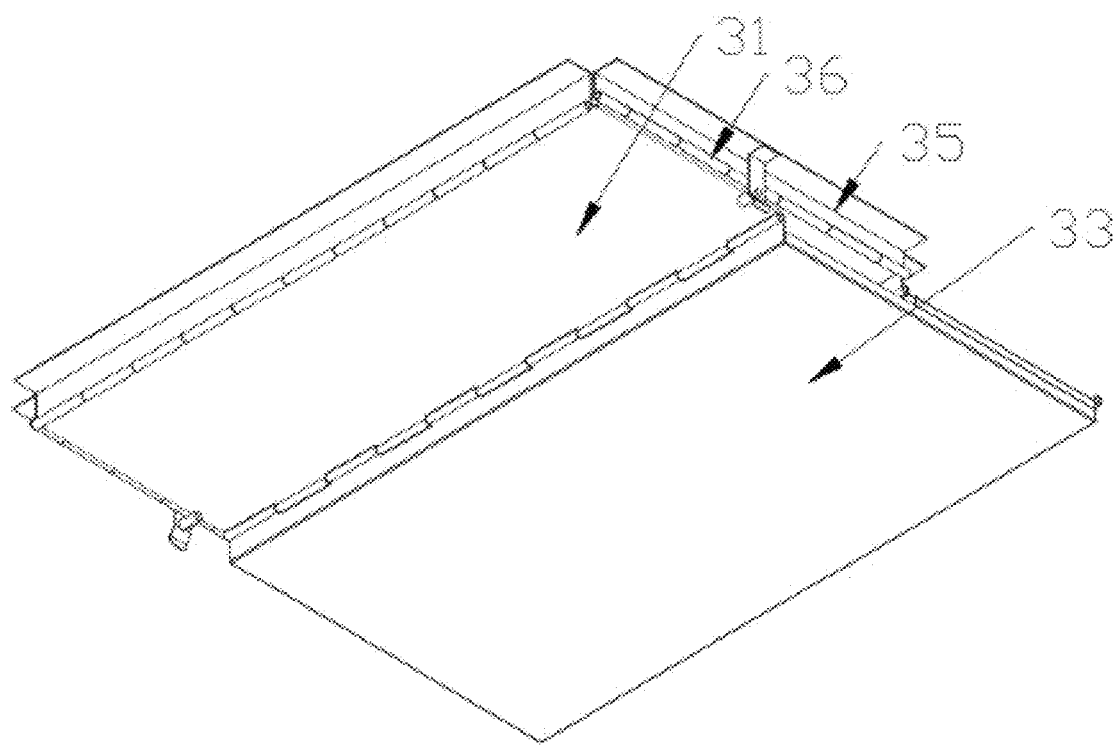
FIG. 38 is a schematic diagram of the lower side structure of the oven after being folded.
Figure 39:
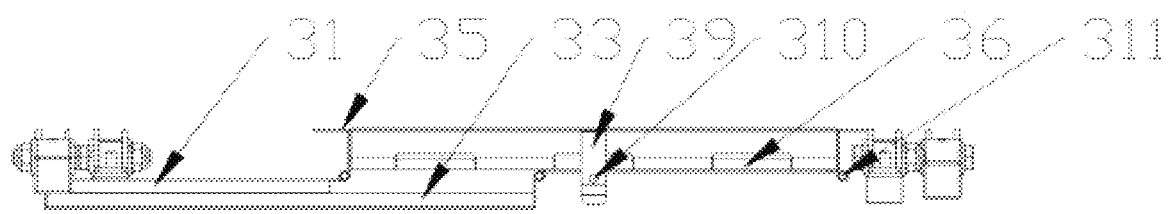
FIG. 39 is a schematic diagram of the side view structure of the oven after being folded.

In the figures, 1 refers to the oven body; 11 refers to the oven cover; 12 refers to the universal wheel; 13 refers to the pulling rod; 2 refers to the cooking bench; 3 refers to the oven; 31 refers to the side plate; 32 refers to the end plate; 33 refers to the bottom plate; 34 refers to the top plate; 35 refers to the angle beam; 36 refers to the protrusion; 37 refers to the grill; 38 refers to the carbon rack; 39 refers to the locking bolt; 310 refers to the locking pin; 311 refers to the through shaft; 4 refers to the table; 41 refers to the table leg; 42 refers to the hinge; 43 refers to the "U"-shaped steel; 5 refers to the functional plate; 51 refers to the flat plate; 52 refers to the sink; 53 refers to the column; 54 refers to the hanging rod; 6 refers to the lamp holder; 61 refers to the lamp pole; 62 refers to the mounting nut; 63 refers to the nail pole; 64 refers to the light bulb; 65 refers to the first embedding hole; 66 refers to the second embedding hole; 67 refers to the third embedding hole; 68 refers to the handle; 69 refers to the mounting bolt; 610 refers to the limiting pin; 7 refers to the clasp; 71 refers to the base block; 72 refers to the pin shaft; 73 refers to the end cover; 74 refers to the hook; 75 refers to the lug; 76 refers to the groove; 77 refers to the embedding groove; 78 refers to the shaft hole; 71a refers to the box body; 71b refers to the outer edge; 8 refers to the table hinge; 9 refers to the connecting piece; 91 refers to the pressing plate; 92 refers to the connecting plate; 93 refers to the metal hook; 94 refers to the side end plate; 10 refers to the locking piece; 101 refers to the rotating handle; 102 refers to the base; 103 refers to the limiting cylinder; 104 refers to the first ratchet shaft; 105 refers to the limiting ring; 106 refers to the rope; 107 refers to the first ratchet teeth; 108 refers to the second ratchet teeth; 109 refers to the second ratchet shaft; 1010 refers to the connecting sheet; 1011 refers to the first limiting piece; 1012 refers to the second limiting piece; 1013 refers to the third limiting piece; 1014 refers to the fourth limiting piece; 1015 refers to the fifth limiting piece; 1016 refers to the compressing ring; 1017 refers to the limiting disc.

DETAILED DESCRIPTION OF THE PREFERRED EMBODIMENTS

The invention will be described in detail hereinafter with reference to the drawings.

An outdoor barbecue oven, comprising an oven body 1, a cooking bench 2, an oven 3, tables 4, a functional plate 5, and a lamp holder 6; when folded, the cooking bench 2, the oven 3, the tables 4, the function plate 5, and the lamp holder 6 are all located in the oven body 1; when unfolded, the oven body 1, the cooking bench 2, the oven 3, and the tables 4 are connected in sequence; the functional plate 5 is connected to the side end of the oven body 1, wherein the functional plate 5 is connected to the oven body 1 through a clasp 7, and the cooking bench 2 is connected to the oven body 1 through a table hinge 8; the cooking bench 2, the oven 3, and the tables 4 are connected by connecting pieces 9; the lamp holder 6 is fixed on the top of the oven body 1; the cooking bench 2 is installed with locking pieces 10;

the oven 3 comprises side plates 31, end plates 32, a bottom plate 33, and a top plate 34; the tops of the side plates 31 and the end plates 32 are both connected to the top plate 34 through angle beams 35; the top end of the angle beam 35 is fixedly connected to the bottom surface of the top plate 33; the bottoms of the two side plates 31 and the two sides of the bottom plate 33, the tops of the two side plates 31 and the angle beams 35, and the two end plates 32 and the angle beams 35 are all rotatably connected by through shafts 311;

the lamp holder 6 is a rod-shaped structure formed by inserting and embedding a plurality of lamp poles 61 in sequence; the light pole 61 at the bottom is fixedly connected to the top surface of the oven body 1 through a mounting nut 62, and the light pole 61 at the top is connected to a tail pole 63; the tail pole 63 is a rectangular metal rod; the tail pole 63 is hung with a light bulb 64; when folded, the tail pole 63 is embedded in the light pole 61; when unfolded, the tail pole 63 and the light poles 61 form a "7"-shaped structure as a whole;

the clasp 7 comprises a base block 71 and a hook 74 that are rotatably connected; the base block 71 is fixedly connected to the oven body 1; the base block 71 is a box-shaped structure with an opening at the side end; the open end of the base block 71 is provided with an end cover 73; the end cover 73 is a rectangular frame-shaped metal plate placed vertically; the hook 74 is rotatably connected to the end cover 73; when the hook 74 rotates to one end, that is, when it can no longer be rotated in one direction, the hook 74 is located inside the base block 71; when the hook 74 rotates to the other end, that is, rotates in the opposite direction until it can no longer be rotated, the hook 74 is located outside the base block 71 and the vertical interface of the hook 74 is in a "J"-shaped structure;

the connecting piece 9 comprises a pressing plate 91 and a connecting plate 92, wherein the pressing plate 91 and the connecting plate 92 are in a "T"-shaped structure as a whole; the left and right sides of the connecting plate 92 are both provided with a metal hook 93; the pressing plate 91, the connecting plate 92, and the metal hook 93 are an integral structure formed at one time; the left and right sides of the connecting plate 92 are both provided with the table 4; the table 4 is located between the metal hook 93 and the pressing plate 91;

the locking piece 10 comprises a rotating handle 101, a base 102, and a rope 106; the rotating handle 101 is rotatably connected to the base 102; the base 102 is installed with a limiting cylinder 103; the limiting cylinder 103 is installed with a first ratchet shaft 104; the top of the limiting cylinder 103 is provided with a limiting ring 105; the rotating handle 101 is connected to the first ratchet shaft 104 and the limiting ring 105 through a first ratchet teeth 107 and a second ratchet teeth 108 that are meshed with each other; the rope 106 penetrates the limiting cylinder 103 and the first ratchet shaft 104.

The oven body 1 is a rectangular parallelepiped; the top of the oven body 1 is an oven cover 11; the oven cover 11 is in interference connection with the oven body 1; the lamp holder 6 is installed on the oven cover 11;

the bottom of the oven body 1 is provided with universal wheels 12, and the universal wheels 12 are bolted to the bottom of the oven body 1; the number of the universal wheels 12 is multiple; optimally, the number of the universal wheels 12 is four, and the four universal wheels 12 are respectively located at the four corners of the bottom of the oven body 1;

the side end of the oven body 1 is provided with a pulling rod 13; the pulling rod 13 can be purchased directly; a hole is punched on the oven body 1 at the position corresponding to the installation hole of the pulling rod 13, which is then installed on the oven body 1 through bolts.

The side end of the cooking bench 2 is connected to one end of the table hinge 8, the number of the table hinges 8 is multiple, and the other end of the table hinge 8 is connected to the side wall of the oven body 1; when the table hinge 8 is unfolded, the cooking bench 2 and the top surface of the oven body 1 are located on the same plane; after the table hinge 8 is folded, the cooking bench 2 is placed upside down on the top surface of the oven body 1;

the cooking bench 2 is a gas stove; the locking piece 10 is located on the side wall of the cooking bench 2; the oven body 1 is provided with a locking catch 101; the locking piece 10 is provided with a rope 106; when the table hinge 8 is folded, the rope 106 is sleeved on the locking catch 101; the number of the locking pieces 10 is multiple, and the positions of the rope 106 and the locking catch 101 of the multiple locking pieces 10 correspond to each other.

The top of the oven 3 is provided with a grill 37; the grill 37 is a metal mesh provided with a plurality of through holes; the grill 37 is embedded in the top plate 34 and the top surface of the grill 37 is the same height as the top surface of the top plate 34; the grill 37 is used for placing ingredients, and the through holes on the grill 37 are used to put the oil from the ingredients into the oven;

the oven 3 is provided with a carbon rack 38; a plurality of the carbon racks 38 is a mesh metal rack formed by welding metal strips arranged vertically and horizontally; the oven 3 is provided with "L" section steel, and the carbon rack 38 is placed on the "L" section steel;

a locking bolt 39 and a locking pin 310 are connected between the end plate 32 and the angle beam 35; the locking pin 310 penetrates the locking bolt 39 in a horizontal direction and is embedded in the end plate 32; the locking bolt 39 and the locking pin 310 ensure the stability of the oven 3 after the oven 3 is unfolded, and prevent the side plates 31 and end plates 32 of the oven 3 from rotating and skewing due to bumps or shaking;

the lower edge of the angle beam 35, the upper edge of the side plate 31, and the lower edge of the side plate 31 are all provided with a plurality of cylindrical protrusions 36; the protrusions 36 and the angle beams 35, the protrusions 36 and the side beams are all integral structures formed at one time;

the table 4 and the oven 3 are supported by table legs 41; the table legs 41 are rotatably connected to the table 4 and the oven 3 through hinges 42; one end of the hinge 42 is bolted to the table leg 41, and the other end thereof is bolted to an "U"-shaped steel 43; the "U"-shaped steel 43 is fixedly connected to the bottom surface of the table 4 and the bottom surface of the top plate 34; when the hinge 42 is folded, the table legs 41 are parallel to the table 4.

The functional plate 5 comprises a flat plate 51 and a sink 52; the cooking bench 2 is in the main cooking location; the functional plate 5 is installed on the oven body 1, which is relatively close to the cooking bench 2, and at the same time forms a corner integrally with the cooking bench 2 and the oven body 1; ingredients and kitchen utensils can be placed on the flat plate 51 and the oven cover 11, and the tableware and ingredients can be cleaned by pouring water into the sink 52; one side of the bottom of the functional board 5 is installed with a column 53; the top end of the column 53 is embedded in the bottom of the functional plate 5 and connected by threads, and the bottom end of the column 53 abuts against the ground; the other side of the bottom of the functional board 5 is provided with a hanging rod 54; the hanging rod 54 is a metal rod, the hanging rod 54 is welded to the functional plate 5, and the hanging rod 54 is mounted on the hook 74; one end of the functional plate 5 is supported by the column 53, and the other end thereof is supported by the oven body 1.

The light pole 61 is a metal pole whose diameter decreases from bottom to top, and the light pole 61 is rotatably connected to the tail pole 63 by a limiting pin 610;

the light pole 61 at the top is provided with a first embedding hole 65 and a second embedding hole 66 on both sides of the light pole 61; the length of the first embedding hole 65 is greater than the length of the tail pole 63, and the length of the second embedding hole 66 is equal to the width of the tail pole 63;

the bottom of the light pole 61 at the bottom is provided with a mounting bolt 69; the mounting bolt 69 is welded and connected to the light pole 61, and is used to be threaded with other functional parts of the outdoor barbecue oven;

the end of the tail pole 63 is provided with a third embedding hole 67, and a handle 68 of the lamp bulb 64 is embedded in the third embedding hole 67 to prevent the light bulb 64 from slipping off the light at tail when using and disassembling the lamp holder;

when folded, the tail pole 63 passes through the first embedding hole 65 and is embedded in the light pole 61;

when unfolded, the tail pole 63 is embedded from top to bottom and mounted in the second embedding hole 66, that is, the bottom of the tail pole 63 is mounted on the second embedding hole 66;

the mounting bolt 69 is provided with the mounting nut 62, and the mounting nut 62 is threaded with the mounting bolt 69; the mounting nut 62 is used to adjust the direction; since the tail pole 63 does not necessarily face the required direction after installation, it is necessary to adjust the direction by twisting the mounting nut when the tail pole 63 faces the oven.

The end cover 73 is provided with a plurality of lugs 75; the lug 75 and the end cover 73 are an integral structure formed by one-time casting; the base block 71 is provided with a plurality of grooves 76; the number of the grooves 76 and the lugs 75 are equal and the positions are corresponding; the groove 76 and the base block 71 are an integral structure formed by one-time casting; the lug 75 is embedded in the groove 76, and the bolt used to connect the base block 71 and the oven body 1 passes through the lug 75 and the groove 76 in sequence and is embedded in the oven body 1.

The hook 74 is in shaft pin connection with the end cover 73, the end cover 73 is provided with a plurality of embedding grooves 77 formed therewith in sequence, and the hook 74 is provided with a plurality of shaft holes 78 formed therewith in sequence; a pin shaft 72 penetrates the embedding groove 77 and the shaft hole 78; the multiple embedding grooves 77 and the multiple shaft holes 78 are all distributed in a linear array in the axial direction of the pin shaft 72; the embedding grooves 77 and the shaft holes 78 are spaced apart.

the base block 1 comprises a box body 71*a* and an outer edge 71*b*; the box body 71*a* and the outer edge 71*b* are an integral structure formed by one-time casting; the vertical section of the outer edge 71*b* is coupled with the end cover 73; one side of the outer edge 71*b* is fixedly connected to the end cover 73, and the other side thereof abuts against the oven body 1; the box body 71*a* is embedded in the oven body 1;

the embedding groove 77 is in a "C"-shaped structure; the pin shaft 72 is in key connection with the shaft hole 78, and the pin shaft 72 is rotatably connected to the embedding groove 77.

The two metal hooks 93 are symmetrical about the axis of the connecting plate 92. The connecting piece is used to connect the two adjacent platens; since the pressing plate 91 and the connecting plate 92 are in a "T"-shaped structure, that is, the bottom surface of the pressing plate 91 is on both sides of the connecting plate 92, at this time, the two adjacent platens are located between the two sets of the metal hook 93 and the pressing plate 91;

the metal hook 93 is located at the bottom or middle of the connecting plate 92. The metal hook 93 is located at any height of the connecting plate 92, and its height depends on the thickness of the connected platen or the height of the side end plate;

the platen is in a plate-like structure; the metal hook 93 and the pressing plate 91 are in an "L"-shaped structure as a whole; the top surface of the platen abuts against the bottom surface of the pressing plate 91; the bottom surface of the platen is mounted on the horizontal side of the "L"-shaped structure;

the outer extension of the platen is provided with a side end plate 94; the metal hook 93 and the pressing plate 91 are in a "J"-shaped structure as a whole; the top surface of the platen abuts against the bottom surface of the pressing plate 91; the side end plate 94 is embedded in the "J"-shaped structure;

the two adjacent platens are connected by a plurality of connecting pieces, and the plurality of the connecting pieces are distributed in a linear array along the gap between the platens;

the platen comprises the table 4 and the top plate 34.

The rotating handle 101 is an inverted barrel structure; the first ratchet teeth 107 is located on the inner wall of the rotating handle 101; the inner top surface of the rotating handle 101 is provided with a second ratchet shaft 109; the first ratchet shaft 104 meshes with the ratchet teeth of the second ratchet shaft 109; the second ratchet shaft 109 and the rotating handle 101, and the first ratchet teeth 107 and the rotating handle 101 are all integral structures formed at one time; the outer side of the rotating handle 101 is provided with anti-slip lines;

the outer ring side of the limiting ring 105 is provided with an arc-shaped connecting sheet 1010; the second ratchet teeth 108 is located on the outer ring side of the connecting sheet 1010; a gap is left between the connecting sheet 1010 and the limiting ring 105; the connecting piece 1010, the limiting ring 105, and the second ratchet teeth 108 are an integral structure formed at one time; the number of the connecting pieces 1010 is multiple; the multiple connecting pieces 1010 are distributed in a circular array on a horizontal section centered on the axis of the first ratchet shaft 104;

the top of the limiting cylinder 103 is provided with a first limiting piece 1011 and a second limiting piece 1012 formed therewith at one time; the lower side end of the limiting cylinder 103 is provided with a third limiting piece 1013 and a fourth limiting piece 1014 formed therewith at one time; the upper side end of the limiting cylinder 103 is provided with a fifth limiting piece 1015 formed therewith at one time; the first limiting piece 1011 is a cylindrical structure formed by a plurality of arc-shaped metal sheets distributed in a circular array; a gap is left between the multiple arc-shaped metal sheets; the first ratchet shaft 104 and the second ratchet shaft 109 are embedded in the first limiting piece 1011 from the upper and lower ends; the second limiting piece 1012 comprises a plurality of metal sheets distributed in a circular array; the number of the metal sheets is the same as the number of the connecting sheets 1010; the limiting ring 105 is located between the first limiting piece 1011 and the second limiting piece 1012; the second limiting piece 1012 is embedded in the gap between the limiting ring 105 and the connecting sheet 1010; the first limiting piece 1011 and the second limiting piece 1012 are used to provide guidance for the movement and rotation of the limiting ring 105, the limiting cylinder 103, the first ratchet shaft 104, and the rotating handle 101 in the axial direction, that is, the limiting ring 105, the first ratchet shaft 104, and the rotating handle 101 cannot move in the horizontal direction, but can only move in the vertical direction and rotate in the horizontal direction; the third limiting piece 1013 and the fourth limiting piece 1014 are embedded in the gap of the base 102; the third limiting piece 1013 and the fourth limiting piece 1014 are used to fix the limiting cylinder 103 on the base 102; the rope 106 penetrates the third limiting piece 1013; the fifth limiting piece 1015 is in a ring structure, and the bottom surface of the fifth limiting piece 1015 abuts against the top surface of the barrel eaves of the rotating handle 101 barrel structure; the fifth limiting piece 1015 limits the maximum height of the rotating handle 101 in the vertical direction to prevent the rotating handle 101 from coming out;

the upper and lower ends of the first ratchet shaft 104 are both sleeved with a limiting disc 1017; the rope 106 is wound on the first ratchet shaft 104; sufficient space is left between the first ratchet shaft 104 and the inner wall of the limiting cylinder 103 for storing the rope 106 wound on the first ratchet shaft 104; the limiting disc 1017 is used to limit the first ratchet shaft 104 to prevent it from moving in the horizontal direction in the limiting cylinder 103;

the base 102 is provided with a compression ring 1016, and the compression ring 1016 is threaded with the base 102;

the meshing direction of the first ratchet shaft 104 and the second ratchet shaft 109 is opposite to the meshing direction of the first ratchet teeth 107 and the second ratchet teeth 108.

In moving, the pulling rod 13 can be drawn out, and the oven body 1 can be pulled through the universal wheels 12, or the oven body 1 can be transported through the clasp 7. For traditional clasps, the base block 71 needs to be installed on the oven body 1 first, and then according to the installation needs of the sink 52 and the flat plate 51, a hole 74 is punched on the oven body 1 to install the hook 74; no matter whether the oven is folded or unfolded, the hook 74 will be exposed outside the oven body 1, which is very easy to be bumped, unless the hook 74 is removed, however, it is very inconvenient to disassemble and assemble each time.

When in use, it is necessary to unfold each components of the oven in sequence. First, open the oven cover 11, turn the cooking bench 2 through the table hinges 8 and fix the cooking utensils at the attachment point on the cooking bench with the locking pieces 10, and take out the various components from the oven body 1. Install the function plate 5 on both sides of the oven body 1 through the clasp 7, install the table legs 41 on the bottom surface of the table 4 and the top plate 34, unfold the oven 3 and all the table legs 41, connect each of the tables 4, the table 4 and the oven 3, and the oven 3 and the cooking bench 2 through the connecting piece 9, and then insert the light pole into the oven cover 11 to complete the installation.

Steps of connecting the oven body 1 and the functional plate through the clasp 7:

When assembling the base block 71, first attach the end cover 73 to the outer edge 71*b*, so that the protrusion 75 is embedded into the groove 76, then the protrusion 75 and the outer edge 71*b* are penetrated by the bolt and screwed into the oven body 1; if the end cover 73 has been buckled on the base block 71 before leaving the factory, the operation is the same as the traditional clasp installation steps, but the hook 74 has been installed during the process of installing the end cover 73, which eliminates the installation step of the hook 74.

When the hook 74 is not used, it is transferred into the oven body 71*a*, and the outer structure of the oven body 1 is regular to avoid bumps.

When the hook 74 is needs to be used, turn the hook 74 to hang the accessory on the hook 74; in order to complete the overlap of the flat plate 51 and the sink 52, you only need to hang the flat plate 51 and the hanging rod 54 on the sink 52 on the hook 74.

The embedding groove 77 is in an interference connection with the pin shaft 79, and there is a certain damping force when the hook 74 is rotated, so as to prevent the hook 74 from falling out of the box body 71*a* due to movement and transportation.

The embedding groove 77 has a "C"-shaped structure, which facilitates the assembly of the hook 74 and the end cover 73. The shaft hole 78 and the shaft pin 79 are always in a key-linked fixed state, and no installation is required; instead, the shaft pin 79 only needs to be pressed in along the "C"-shaped notch of the embedding groove 77 to complete the installation.

In assembling, first draw out the multi-section light poles 61, and when the light poles 61 are drawn out, the two sections of light poles connected at both ends are in interference connection. Then erect the light pole 61, and rotate the tail pole 63 to be mounted on the second embedding hole 66. Hang the light bulb 64 on the third embedding hole 67, insert the mounting bolt 69 into the oven cover 11, adjust the direction of the tail pole 63, and then tighten the mounting nut 62 to fix it.

In disassembling, first loosen the mounting nut 62, then unscrew the mounting bolt 69 to remove the light pole 61, and then remove the light bulb 64; rotate the tail pole 63 to be embedded into the first embedding hole 65, and then retract the light pole 61, so that the light pole located above is embedded into the light pole located below.

The limiting pin 610 can also prevent the upper light pole 61 from being completely submerged in the lower light pole 61 and unable to be pulled out after being contracted.

Fix the attached cooking utensils on the cooking bench 2 through the locking pieces 10:

in assembling, the entire device is fixed at the installation position through the base 102.

The locking mechanism of the rope 106:

when the rotating handle 101 is rotated in a single direction, the first ratchet shaft 104 and the second ratchet shaft 109 are locked, and the rotating handle 101 is driven by the second ratchet shaft 109 to rotate the first ratchet shaft 104; the rope 106 is wound on the first ratchet shaft 104; during this process, the first ratchet teeth 107 and the second ratchet teeth 108 ensure that the rotating handle 101 will not rotate in the opposite direction and prevent the rope 106 that has been wound on the first ratchet shaft 104 from loosening.

The loosening mechanism of the rope 106:

pull out the rotating handle 101 upwards to disengage the first ratchet shaft 104 from the second ratchet shaft 109; at this time, the first ratchet shaft 104 can be freely rotated without being restricted by the first ratchet teeth 107 and the second ratchet teeth 108, and the rope 106 wound on the first ratchet shaft 104 can be pulled out by hand.

Based on the limit of the first limiting piece 1011 to the fifth limiting piece 1015, the base 102 and the limiting cylinder 103 are always in a fixed state; the first ratchet shaft 104 can only be rotated, and the limiting ring 105 and the rotating handle 101 can be rotated, and at the same time can move along the axial direction of the first ratchet shaft 104, so as to realize the clutching of the first ratchet shaft 104 and the second ratchet shaft 109; at the same time, the second limiting piece 1012 can also abut against the connection between the limiting ring 105 and the arc-shaped connecting sheet 1010 to provide support for preventing reverse rotation of the rotating handle 101.

When the rope 106 is tightened, the first ratchet teeth 107 and the second ratchet teeth 108 will be loaded. The rope 106 is compressed through the thread by the compression ring 1016, which can reduce the compounding of the first ratchet teeth 107 and the second ratchet teeth 108, and avoid the fracture of the connection between the limiting ring 105 and the arc-shaped connecting piece 1010. Before locking and releasing the rope, the compression ring 1016 needs to be loosened first. If the needed pulling force of the lock rope is small, the compression ring 1016 may not be used for the convenience of operation.

Based on the above locking principle, the base 102 is installed on the side wall of the cooking bench 2, and then the attached cooking utensils are placed on the top surface of the cooking bench; then the rope 106 is put on, and the rope 106 is tightened to complete the fixation.

Steps to connect the two tables 4 through the connecting pieces 9:

During production, the position of the hook 94 on the connecting plate 92 is determined according to the thickness of the two adjacent tables 4 that need to be connected or the height of the side plate 95, and the shape of the hook 94 is determined according to whether it is connected to the side plate or the table.

When assembling, take out the table 4 and connect it with the table legs, join the two adjacent tables together, and place a plurality of the connecting pieces between the two tables 4, and embed the table 4 or the side plates 95 between the pressing plate 91 and the hook 94. Compared with hinges and fisheye joints, multiple shaft pins and bolts are connected, which is convenient and efficient for installation.

After installation, the weight of the table 4 and the objects thereon will be shared by the bottom of the pressing plate 91, the side wall of the connecting plate 92, the top surface of the hook 94 or the inner side of the hook structure. The upper pressure and lower hanging structure is adopted to increase the load bearing.

The unfolding steps of the oven 3;

After being folded, the end plates 32 are folded toward the inside of the oven body and are located below the top plate 34; the side plates 31 are located below the end plates 32, and the bottom plate 33 is located below the side plates 31. The two side plates 31 are located on the same horizontal plane; one of the side plates 31 is folded toward the inner side of the oven body, and the other side plate 31 is folded toward the outer side of the oven body.

When folding, first pull out the locking pin 310, and then rotate the end plates 32 toward the inner side of the oven body with the through shaft 311 as the axis, so that it is placed in a horizontal direction, while the carbon rack 38 is located between the top plate 34 and the end plates 32; then fold the side plates 31: one of the side plates is turned inside the oven body, and the other side plate is turned outside the oven body; at this time, the bottom plate 33 moves obliquely upward with the turning of the side plates 31, and finally the side plates 31 are placed horizontally; the top surface of the bottom plate is close to the side plates to complete the folding.

The mechanism of unfolding the oven is the same. After unfolding, the locking pin 310 is inserted. The end plates 32 cannot be rotated due to the limit of the locking pin 310 and the locking bolt 39, and other parts of the oven body cannot be folded to achieve the purpose of fixing the oven body.

The top plate 34 is used to install the table legs 41 and realize the connection with other parts of the outdoor barbecue oven such as the table and the cooking bench.

The above technical solutions only embody the preferred technical solutions of the invention. Any modifications that may be made by those skilled in the art to some parts of them all embody the principles of the invention and shall all fall within the protection scope of the invention.

What is claimed is:

1. An outdoor barbecue oven, comprising an oven body (1), a cooking bench (2), an oven (3), tables (4), a functional plate (5), and a lamp holder (6); when folded, the cooking bench (2), the oven (3), the tables (4), the function plate (5), and the lamp holder (6) are all located in the oven body (1); when unfolded, the oven body (1), the cooking bench (2), the oven (3), and the tables (4) are connected in sequence; the functional plate (5) is connected to the side end of the oven body (1), where in the functional plate (5) is connected to the oven body (1) through a clasp (7), and the cooking bench (2) is connected to the oven body (1) through table hinges (8); the cooking bench (2), the oven (3), and the tables (4) are connected by connecting pieces (9); the lamp holder (6) is fixed on the top of the oven body (1); the cooking bench (2) is installed with locking pieces (10);

the oven (3) comprises side plates (31), end plates (32), a bottom plate (33), and a top plate (34); the tops of the side plates (31) and the end plates (32) are both connected to the top plate (34) through angle beams (35); the bottoms of the two side plates (31) and the two sides of the bottom plate (33), the tops of the two side plates (31) and the angle beams (35), and the two end plates (32) and the angle beams (35) are all rotatably connected by through shafts (311);

the lamp holder (6) is a rod-shaped structure formed by inserting and embedding a plurality of lamp poles (61) in sequence; the light pole (61) at the bottom is fixedly connected to the top surface of the oven body (1) through a mounting nut (62), and the light pole (61) at the top is connected to a tail pole (63); the tail pole (63) is hung with a light bulb (64); when folded, the tail pole (63) is embedded in the light pole (61); when unfolded, the tail pole (63) and the light poles (61) form a "7"-shaped structure as a whole;

the clasp (7) comprises a base block (71) and a hook (74) that are rotatably connected; the base block (71) is fixedly connected to the oven body (1); the open end of the base block (71) is provided with an end cover (73); the hook (74) is rotatably connected to the end cover (73); when the hook (74) rotates to one end, the hook (74) is located inside the base block (71); when the hook (74) rotates to the other end, the hook (74) is located outside the base block (71), the connecting piece (9) comprises a pressing plate (91) and a connecting plate (92), wherein the pressing plate (91) and the connecting plate (92) are in a "T"-shaped structure as a whole; the left and right sides of the connecting plate (92) are both provided with a metal hook (93); the pressing plate (91), the connecting plate (92), and the metal hook (93) are an integral structure formed at one time; the left and right sides of the connecting plate (92) are both provided with the table (4); the table (4) is located between the metal hook (93) and the pressing plate (91);

the locking piece (10) comprises a rotating handle (101), a base (102), and a rope (106); the rotating handle (101) is rotatably connected to the base (102); the base (102) is installed with a limiting cylinder (103); the limiting cylinder (103) is installed with a first ratchet shaft (104); the top of the limiting cylinder (103) is provided with a limiting ring (105); the rotating handle (101) is connected to the first ratchet shaft (104) and the limiting ring (105) through a first ratchet teeth (107) and a second ratchet teeth (108) that are meshed with each other; the rope (106) penetrates the limiting cylinder (103) and the first ratchet shaft (104).

2. The outdoor barbecue oven according to claim 1, wherein the oven body (1) is a rectangular parallelepiped; the top of the oven body (1) is an oven cover (11); the lamp holder (6) is installed on the oven cover (11); the bottom of the oven body (1) is provided with universal wheels (12), and the universal wheels (12) are bolted to the bottom of the oven body (1); the side end of the oven body (1) is provided with a pulling rod (13); the pulling rod (13) can be purchased directly; a hole is punched on the oven body (1) at the position corresponding to an installation hole of the pulling rod (13), which is then installed on the oven body (1) through bolts.

3. The outdoor barbecue oven according to claim 1, wherein when the table hinge (8) is unfolded, the cooking bench (2) and the top surface of the oven body (1) are located on the same plane.

4. The outdoor barbecue oven according to claim 1, wherein the top of the oven (3) is provided with a grill (37), and the grill (37) is embedded in the top plate (34);

the oven (3) is provided with a carbon rack (38);

a locking bolt (39) and a locking pin (310) are connected between the end plate (32) and the angle beam (35); the locking pin (310) penetrates the locking bolt (39) in a horizontal direction and is embedded in the end plate (32);

the lower edge of the angle beam (35), the upper edge of the side plate (31), and the lower edge of the side plate (31) are all provided with a plurality of cylindrical protrusions (36).

5. The outdoor barbecue oven according to claim 1, wherein the table (4) and the oven (3) are supported by table legs (41); the table legs (41) are rotatably connected to the table (4) and the oven (3) through hinges (42); when the hinge (42) is folded, the table legs (41) are parallel to the table (4).

6. The outdoor barbecue oven according to claim 1, wherein the functional plate (5) comprises a flat plate (51) and a sink (52); the cooking bench (2) is in a main cooking location; one side of the bottom of the functional board (5) is installed with a column (53), and the other side of the bottom of the functional board (5) is provided with a hanging rod (54); the hanging rod (54) is a metal rod, the hanging rod (54) is welded to the functional plate (5), and the hanging rod (54) is mounted on the hook (74).

7. The outdoor barbecue oven according to claim 1, wherein the light pole (61) is rotatably connected to the tail pole (63);
the light pole (61) at the top is provided with a first embedding hole (65) and a second embedding hole (66) on both sides of the light pole (61);
the bottom of the light pole (61) at the bottom is provided with a mounting bolt (69);
the end of the tail pole (63) is provided with a third embedding hole (67), and a handle (68) of the lamp bulb (64) is embedded in the third embedding hole (67);
when folded, the tail pole (63) passes through the first embedding hole (65) and is embedded in the light pole (61);
when unfolded, the tail pole (63) is embedded from top to bottom and mounted in the second embedding hole (66);
the mounting bolt (69) is provided with the mounting nut (62), and the mounting nut (62) is threaded with the mounting bolt (69).

8. The outdoor barbecue oven according to claim 1, wherein the end cover (73) is provided with a plurality of lugs (75); the base block (71) is provided with a plurality of grooves (76); the groove (76) and the base block (71) are an integral structure formed by one-time casting; the lug (75) is embedded in the groove (76), and a bolt passes through the lug (75) and the groove (76) in sequence and is embedded in the oven body (1);
the hook (74) is in shaft pin connection with the end cover (73); the end cover (73) is provided with a plurality of embedding grooves (77); the hook (74) is provided with a plurality of shaft holes (78); a pin shaft (72) penetrates the embedding groove (77) and the shaft hole (78);
the base block (71) comprises a box body (71a) and an outer edge (71b); the vertical section of the outer edge (71b) is coupled with the end cover (73); one side of the outer edge (71b) is fixedly connected to the end cover (73), and the other side thereof abuts against the oven body (1); the box body (71a) is embedded in the oven body (1);
the embedding groove (77) is in a "C"-shaped structure; the pin shaft (72) is in key connection with the shaft hole (78), and the pin shaft (72) is rotatably connected to the embedding groove (77).

9. The outdoor barbecue oven according to claim 1, wherein the first ratchet teeth (107) is located on the inner wall of the rotating handle (101); the inner top surface of the rotating handle (101) is provided with a second ratchet shaft (109); the first ratchet shaft (104) meshes with the ratchet teeth of the second ratchet shaft (109); the outer side of the rotating handle (101) is provided with anti-slip lines;
the outer ring side of the limiting ring (105) is provided with an arc-shaped connecting sheet (1010); the second ratchet teeth (108) is located on the outer ring side of the connecting sheet (1010); a gap is left between the connecting sheet (1010) and the limiting ring (105);
the top of the limiting cylinder (103) is provided with a first limiting piece (1011) and a second limiting piece (1012); the lower side end of the limiting cylinder (103) is provided with a third limiting piece (1013) and a fourth limiting piece (1014); the first ratchet shaft (104) and the second ratchet shaft (109) are embedded in the first limiting piece (1011) from the upper and lower ends; the limiting ring (105) is located between the first limiting piece (1011) and the second limiting piece (1012); the third limiting piece (1013) and the fourth limiting piece (1014) are embedded in the gap of the base (102); the rope (106) penetrates the third limiting piece (1013); a fifth limiting piece (1015) is in a ring structure, and the bottom surface of the fifth limiting piece (1015) abuts against the rotating handle (101);
the upper and lower ends of the first ratchet shaft (104) are both sleeved with a limiting disc (1017); the rope (106) is wound on the first ratchet shaft (104);
the base (102) is provided with a compression ring (1016), and the compression ring (1016) is threaded with the base (102);
the meshing direction of the first ratchet shaft (104) and the second ratchet shaft (109) is opposite to the meshing direction of the first ratchet teeth (107) and the second ratchet teeth (108).

* * * * *